United States Patent
Sengoku

(10) Patent No.: US 9,716,833 B2
(45) Date of Patent: Jul. 25, 2017

(54) ACTUATOR RING CHARACTERISTIC MEASUREMENT METHOD

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 14/693,681

(22) Filed: Apr. 22, 2015

(65) Prior Publication Data

US 2016/0061780 A1 Mar. 3, 2016

Related U.S. Application Data

(60) Provisional application No. 62/044,864, filed on Sep. 2, 2014.

(51) Int. Cl.
*H04N 5/232* (2006.01)
*G02B 27/64* (2006.01)
(Continued)

(52) U.S. Cl.
CPC ....... *H04N 5/23264* (2013.01); *G02B 27/646* (2013.01); *G03B 13/36* (2013.01);
(Continued)

(58) Field of Classification Search
CPC ........... H04N 5/23264; H04N 5/23248; H04N 5/23212; H04N 5/23287; H04N 5/23258;
(Continued)

(56) References Cited

U.S. PATENT DOCUMENTS 8,190,015 B2 * 5/2012 Li ................... H04N 5/2254
396/135
8,379,903 B2 2/2013 Ko et al.
(Continued)

FOREIGN PATENT DOCUMENTS

WO WO-2009032934 A2 3/2009

OTHER PUBLICATIONS

International Search Report and Written Opinion—PCT/US2015/044321—ISA/EPO—Nov. 3, 2015.

*Primary Examiner* — Albert Cutler
(74) *Attorney, Agent, or Firm* — Knobbe, Martens, Olson & Bear, LLP

(57) ABSTRACT

Methods and systems are disclosed for determining at least one actuation characteristic of an imaging device. For example, one method includes determining a target distance to move a lens by an actuator to focus a scene on an image sensor, where moving the lens by the actuator causes an associated lens vibration having at least one actuation characteristic, determining a scan sequence having a plurality of successive measurements, each measurement having at least a first measurement parameter and subsequent measurement parameter, each measurement parameter including at least one step and at least one time delay, moving the lens the target distance for each successive measurement based on the measurement parameters of each successive measurement, measuring a performance indicator of each successive measurement, and determining at least one actuation characteristic based on the first measurement parameter of the measurement having the highest performance indicator.

29 Claims, 16 Drawing Sheets

(51) Int. Cl.
*G03B 13/36* (2006.01)
*H04N 101/00* (2006.01)

(52) U.S. Cl.
CPC ..... *H04N 5/23212* (2013.01); *H04N 5/23248* (2013.01); *H04N 5/23258* (2013.01); *H04N 5/23287* (2013.01); *H04N 2101/00* (2013.01); *H04N 2201/046* (2013.01); *H04N 2201/0428* (2013.01)

(58) Field of Classification Search
CPC ....... H04N 2201/0428; H04N 2101/00; H04N 2201/046; G02B 27/646; G03B 13/36
USPC .......................... 348/345, 349, 353, 354, 356
See application file for complete search history.

(56) References Cited

U.S. PATENT DOCUMENTS

| | | |
|---|---|---|
| 9,049,366 B2 | 6/2015 | Zhang et al. |
| 2011/0156763 A1 | 6/2011 | Gao et al. |
| 2013/0286491 A1 | 10/2013 | Hung et al. |
| 2015/0116579 A1 | 4/2015 | Zhang et al. |
| 2016/0062134 A1 | 3/2016 | Sengoku |

\* cited by examiner

ACTUATOR RING CHARACTERISTIC MEASUREMENT METHOD

CROSS-REFERENCE TO RELATED APPLICATIONS

This application claims the benefit of U.S. Provisional Patent Application No. 62/044,864 filed Sep. 2, 2014, entitled "METHODS AND SYSTEMS FOR SWEET SPOT AND FAST VOICE COIL MOTOR SOFTWARE DAMPING" and assigned to the assignee hereof. The disclosure of this prior application is considered part of, and is incorporated by reference in, this disclosure.

TECHNICAL FIELD

The present embodiments relate to imaging devices, and in particular, to methods and apparatus for determining actuator vibration characteristics for use in reducing ringing, damping vibrations, and reducing the time to automatically focus an imaging device.

BACKGROUND

Digital imaging devices with an adjustable focus may employ one of many types of lens actuators, including a voice coil motor (VCM) actuator, a microelectromechanical systems (MEMS) actuator, or a Shape Memory Alloy (SMA) actuator etc. Image capture devices may also have a lens driver controlling an actuator that moves a lens assembly for adjusting focus in the image capture device. During operation of the actuator to adjust the position of the lens, vibration may be introduced to the lens.

This vibration may come from many sources. For example, in a lens adjustment mechanism employing a voice coil motor design, the stimuli for movement of the lens induces vibration in springs supporting the lens. The vibration of the lens may continue for some time before settling at the desired lens position. For example, this vibration or ringing of the lens may last anywhere from approximately 50 milliseconds to approximately 200 ms, and can adversely affect autofocus speed and accuracy. The ringing may also adversely affect desired image capture settings and hence image quality. To mitigate the adverse effects of lens ringing, imaging devices may wait a predetermined threshold period of time after completing a lens movement before capturing an image with the lens. This predetermined threshold period of time may allow the lens to stop ringing before an image is captured, but also reduces the speed of autofocus operation.

The need for an imaging device to wait for a predetermined threshold period of time after completing a lens movement may have adverse effects on the speed at which an imaging device may capture images. For example, in imaging environments with dynamic scenes and focus conditions, a photographer may desire to minimize any delay between when a scene is presented and when the scene may be captured by an imaging device. To the extent the imaging device introduces a delay in image capture to provide for any lens ringing to settle, the captured image may vary from the image selected by the photographer. Similarly, video image capture may also be adversely affected by lens ringing, given the frame rate at which most video is recorded. Existing solutions may not adequately dampen vibrations or ringing within a single ring period. Accordingly, there is a need for systems and methods determine the characteristics of the lens vibration for use in damping the vibration for cameras using autofocus systems to reduce autofocus time, reduce ringing, reduce vibration, and improve image quality.

SUMMARY

The systems, methods, and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

According to one aspect, a method for determining at least on actuation characteristic of an imaging device is disclosed. The method includes determining a target distance to move a lens by an actuator to focus a scene on an image sensor, where moving the lens by the actuator causes an associated lens vibration having at least one actuation characteristic. In some embodiments, determining the target distance includes focusing the scene on an image sensor without calibration by moving the lens, via the actuator, to a focus position, causing a lens vibration and waiting until the lens vibration settles, and moving the lens off of the focus position by target distance, causing a lens vibration, and waiting for the vibration to settle. The method also includes determining a scan sequence having multiple successive measurements, each measurement having at least a first measurement parameter and subsequent measurement parameter, each measurement parameter including at least one step and at least one time delay. In some embodiments, the first measurement parameter of each measurement is incrementally adjusted based on the first measurement parameter of the preceding measurement. The method further includes moving the lens the target distance for each successive measurement based on the measurement parameters of each successive measurement, measuring a performance indicator of each successive measurement, and determining at least one actuation characteristic based on the first measurement parameter of the measurement having the highest performance indicator. In some embodiments, the performance indicator correspond to a contrast value of the scene captured by the imaging device as a result of moving the lens the target distance for each successive measurement. In some embodiments, the method also includes identifying the first measurement parameter of the successive measurements having the highest measured performance indicator of the scene, and determining the at least one actuation characteristic based on the identified first measurement parameter of the measurement having the highest performance indicator.

In some embodiments, the lens vibration is a sinusoidal ringing imparted to the lens due to the actuator, where the sinusoidal ringing is related to vibrations and friction resulting from the movement. The sinusoidal ringing can be characterized by at least one actuation characteristic such as the ring period, ringing angular velocity, and/or the damping ratio. The ringing angular velocity and damping ratio are related to the vibrations and friction resulting from the movement.

In some embodiments, moving the lens the target distance for each successive measurement includes moving the lens based on the first measurement parameter of a first measurement in a direction toward the focus position, and inserting the time delay of the first measurement parameter after moving the lens by the first step. The moving the lens the target distance for each successive measurement also includes repeating said moving based on each subsequent measurement parameter, having a subsequent step and time delay, until the lens is moved the target distance, returning the lens to the focus position, inserting each subsequent time delay between each subsequent step, where the moving the lens through all steps is completed within a time substantially equal to the sum of the first and subsequent time delays.

In some embodiments, the method may further include adjusting the first measurement parameter of each successive measurement incrementally based on the first measurement parameter of the preceding measurement. The method may also include identifying a measurement resulting in a decrease in the measured performance indicator of the scene as compared to the performance indicator of a preceding measurement. The method further can include adjusting the first measurement parameter of multiple measurements of a subsequent scan sequence by an increment that is smaller than adjustment of the first measurement parameter of the scan sequence.

In some embodiments, the first step of the first measurement parameter and all subsequent steps of all subsequent measurement parameters combine to equal the target lens distance.

In some embodiments, the first step of the first measurement parameter is the target distance divided by the number of measurement parameters for each successive measurement. In some embodiments, each successive measurement includes a first measurement parameter, having at least a first step, and a second measurement parameter, having at least a second step. In still other embodiments, the first measurement parameter includes a time delay inserted after the first step and before the second measurement parameter, where the time delay is based on a predetermined ring period of the lens vibration. In some embodiments, moving the lens the target distance for each successive measurement also includes moving the lens by the first step of the first measurement parameter in a direction toward the focus position, the first step causing a first lens vibration, retrieving the time delay, and repeating the moving for the second step until the lens is moved the target distance, the second steps being delayed by the time delay, the second step causing a second lens vibration, where the moving the lens through all steps is completed within a period of time substantially equal to the ring period of the lens vibration. In some embodiments, measuring the performance indicator of each successive measurement also includes measuring a performance indicator, the lens being positioned at the target distance, where the performance indicator corresponds to a contrast value of the scene on the image sensor, adjusting the first measurement parameter by sweeping the first step for each successive measurement through multiple first steps, where the target distance is unchanged, and repeating said moving the lens and measuring the performance indicator based on each of the multiple first steps of each successive measurement, where each successive measurement is associated with a performance indicator.

In some embodiments, determining at least one actuation characteristic can also include identifying the first step of the successive measurements having the highest measured performance indicator, and determining the damping ratio of the lens actuation in response to the identified first step of the successive measurement having the highest measured performance indicator. In some embodiments, a ring period of the lens actuation is determined prior to determining the damping ratio and the damping ratio is characterized by $a_0/a_1 = e^{\wedge}(\pi\gamma/\omega_0)$, where $a_0$ is the first step and $a_1$ is the second step of the successive measurement having the highest measured performance ratio, $\gamma$ is the damping ratio, and $\omega_0$ is the angular velocity being related to a predetermined ringing period of the actuator.

In some embodiments, each measurement parameter includes a first time delay and a second time delay, where the first time delay is set to a minimum unit of time and the second time delay is substantially equal to the first time delay. Each measurement parameter can include at least a first, second and third step.

In some embodiments, moving the lens the target distance for each successive measurement includes moving the lens the first step of the first measurement parameter in a direction toward the focus position, the first step of the first measurement parameter causing a first lens vibration, inserting the time delay of the first measurement parameter after moving the lens by the first step, and repeating said moving based on each subsequent measurement parameter, having a subsequent step and time delay, until the lens is moved the target distance, returning the lens to the focus position, inserting each subsequent time delay between each subsequent step, each subsequent step causing a subsequent lens vibration, where the moving the lens through all steps is completed within a time substantially equal to the sum of the first and subsequent time delays.

In some embodiments, measuring of the multiple performance indicators includes measuring a contrast of the scene on the image sensor, the lens being positioned at the focus position, adjusting the first measurement parameter by sweeping the first time delay for each successive measurement through multiple first time delays, where each of the multiple first time delays is changed by adding an increment of time, and repeating the moving the lens and measuring the performance indicator for each of the multiple first time delays of each successive measurement, where each measurement is associated with a measured performance indicator.

In some embodiments, determining at least one lens actuation characteristic includes identifying the first time delay of the successive measurement having the highest measured performance indicator, and determining the ringing period of the actuator in response to the identified first time delay of the successive measurement having the highest measured performance indicator. In some embodiments, the actuation characteristic is the ringing period being equal to the identified first time delay of the successive measurement having the highest measured performance indicator multiplied by the number of measurement parameters.

According to another aspect, an apparatus for determining lens actuation characteristics of an imaging device is disclosed. The apparatus includes a lens, a lens actuator, a processor operably coupled to the lens actuator and a memory operably coupled to the processor. The memory is configured to store an autofocus module that is configured to determine a current lens position and a focus lens position, where the distance between the current lens position and target lens position is a target distance. The memory is also configured to store a parameter determination module that is configured to determine a scan sequence having multiple successive measurements, each measurement having at least a first measurement parameter and subsequent measurement parameter, each measurement parameter including at least one step and at least one time delay. In some embodiments, the parameter determination module is further configured to incrementally adjust the first measurement parameter based on the first measurement parameter of a preceding measurement. The memory is further configured to store a lens control module that is configured to move the lens the target distance for each successive measurement based on the measurement parameters of each successive measurement, a performance measurement module that is configured to measure a performance indicator of each successive measurement, and a characteristic determination module that is configured to determine at least one actuation characteristic based on the first measurement parameter of the measurement having the highest performance indicator.

In some embodiments, the characteristic determination module is also configured to identify the first measurement parameter of successive measurement having the highest measured performance indicator of the scene, and determine at least one actuation characteristic based on the first measurement parameter of the measurement having the highest performance indicator. In some embodiments, the characteristic determination module is further configured to determine a ring period of the lens actuation based on the time delay of the first measurement parameter of the measurement having the highest performance indicator. In other embodiments, the characteristic determination module is further configured to determine a damping ratio of the lens actuation based the ring period and the step of the first measurement parameter of the measurement having the highest performance indicator.

According to another aspect, a non-transitory computer readable medium comprising instructions that when executed causes a processor to perform a method of autofocusing a lens is disclosed. The method performed by the executed code includes determining a target distance to move a lens by an actuator to focus a scene on an image sensor, where moving the lens by the actuator causes an associated lens vibration having at least one actuation characteristic. The method also includes determining a scan sequence having multiple successive measurements, each measurement having at least a first measurement parameter and subsequent measurement parameter, each measurement parameter including at least one step and at least one time delay. The method further includes moving the lens the target distance for each successive measurement based on the measurement parameters of each successive measurement, measuring a performance indicator of each successive measurement, and determining at least one actuation characteristic based on the first measurement parameter of the measurement having the highest performance indicator.

According to another aspect, an apparatus for determining lens actuation characteristics of an imaging device is disclosed. The apparatus includes a means for determining determine a current lens position and a focus lens position, where the distance between the current lens position and target lens position is a target distance. The apparatus also includes a means for determining multiple successive measurements, each measurement having at least a first measurement parameter and subsequent measurement parameter, each measurement parameter including at least one step and at least one time delay. The apparatus further includes a means for moving the lens the target distance for each successive measurement based on the measurement parameters of each successive measurement, a means for measuring a performance indicator of each successive measurement, a means for identifying a measurement having the highest performance indicator, and a means for determining at least one actuation characteristic based on the first measurement parameter of the measurement having the highest performance indicator.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION OF CERTAIN ILLUSTRATIVE EMBODIMENTS

Figure 1:
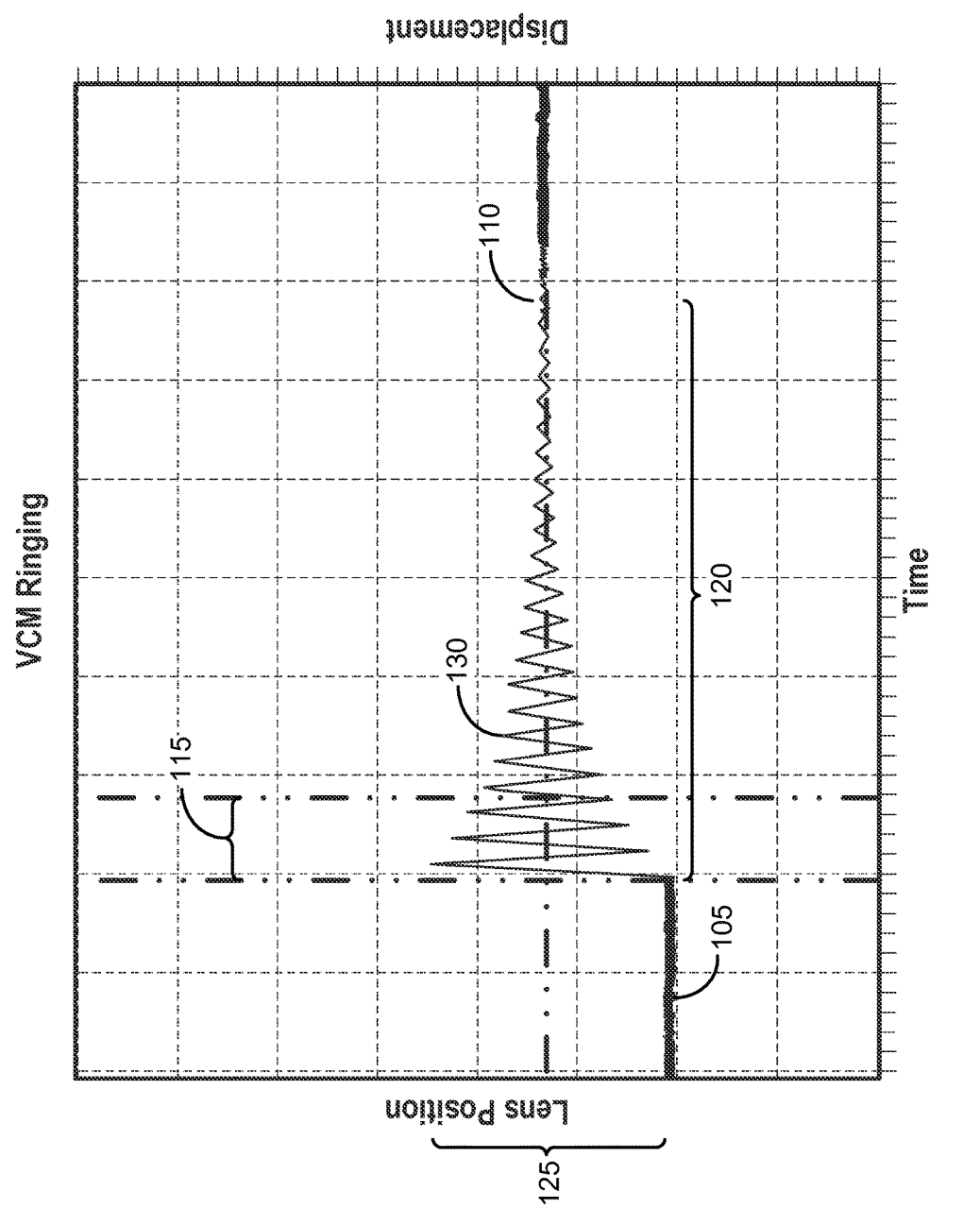
FIG. 1 illustrates the vibration of a lens in an imaging device during an autofocus search.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Embodiments include methods, apparatus, and computer readable media that are configured to measure actuation characteristics of lens vibration imparted onto a lens due to an actuator moving the lens. In some embodiments, the lens vibration imparted on a lens due to movement caused by an actuator includes, but is not limited to, a ring period, angular velocity, and damping ration. In some embodiments, the method may be directed to methods and image capture devices that can break a determined lens movement into smaller steps in an effort to determine one or more of the characteristics of ring generated by any lens actuators, for example but not limited to, a VCM actuator, a MEMS actuator, or a SMA actuator etc. Such embodiments enable implementation of methods and systems capable of dampening the ringing of the lens and stabilizing the lens (non-moving or substantially non-moving) in a shorter amount of time after the lens moves based on the ringing resulting from actuator movement having specific and determinable characteristics (e.g., actuation characteristics). This may result in improvements in autofocus speed and overall accuracy, thereby improving image quality in the image capture device. Accordingly, one embodiment introduces a solution to measure the ring or vibration in springs of the lens actuator and determine characteristics of the lens vibration during a calibration phase or prior to an autofocus operation.

In some embodiments of the methods and apparatus, the actuation characteristics may be determined based on successive autofocus operations ("measurements") and a comparison of performance indicators based on each successive measurement. For example, each autofocus operation or measurement may include different measurement parameters (e.g., the execution times or lens movement distances may be varied between each measurement) such that each autofocus measurement may result in variations in the quality of the focus operation. The quality of each focus operation between iterative autofocus measurements, based on the measurement parameters, may then be compared and the characteristics of the lens vibration imparted onto the lens due to movement by the actuator may be derived as disclosed herein.

In one aspect, a combination of successive measurements having corresponding performance indicators can make up a scan sequence. In some embodiments, the methods and apparatus disclosed herein may be configured to perform multiple scan sequences. The multiple scan sequences may be performed with increasingly finer resolution between scan sequences, whereby the measurement parameters of the successive measurements may be changed. Accordingly, each successive scan sequence may accurately and quickly narrow in on the characteristics of the lens vibration imparted onto the lens due to movement by the actuator.

In one aspect, the distance the actuator moves the lens to reach a focus position may be referred to as a target distance or target lens displacement. Each autofocus measurement includes multiple measurement parameters based on the lens movement through the target distance. The multiple measurement parameters may be determined such that a first measurement parameter may represent a first lens movement caused by the actuator and any subsequent measurement parameters may represent any subsequent lens movement. Each measurement parameter may include specifics related to the distance the actuator is to move the lens ("step") and the amount of time to wait between each movement ("time delay"). In one embodiment, each measurement parameter may be based on dividing the target lens displacement into multiple smaller movements or steps. In some embodiments, the distance of each smaller movement (steps) may be equal. In other embodiments, each step may be varied in distance.

In another aspect, measurement parameters may include a time delay, such as the time between respective lens steps. In one embodiment, the time between respective smaller lens movements may be constant, for example, an increment of time may be selected to delay each of the movements. In another embodiment, the total time for all lens movements may be equal to or less than an image frame. In yet another embodiment, the amount of time between each respective smaller movement may be varied based on actuation characteristics. The amount to vary each smaller movement may be constant and/or may be different as a function of lens position, actuation characteristics, and the number of steps. For example, the amount of time between steps for a given target distance may be different if two steps are used as compared to using three or four steps to move the target distance.

In another aspect, for each successive autofocus measurement an actuator may move a lens based on the multiple measurement parameters for each measurement. Each autofocus measurement includes different measurement parameters. For example, the lens step sizes between each and/or the time delays between each measurement may be different. An image may be captured at the completion of an autofocus measurement, and a performance indicator may be derived from the image. In one embodiment, a performance indicator can be a contrast value of the resulting image. For example, a higher contrast value is indicative that the device was more able to accurately focus on the object. In some embodiments, the methods and systems disclosed herein may identify the autofocus measurement having the best performance indicator. Then, the system may be able to derive the actuation characteristics from the at least one of the measurement parameters of the identified measurement, for example the first measurement parameter having a first step and time delay.

In one aspect according to the disclosure herein, the ring period of a given lens actuation may be determined based on the time delay of the first measurement parameter of an autofocus measurement having the best performance indicator. For example, multiple autofocus measurements may be performed by the system where the time delay of the first measurement parameter is incrementally adjusted between each successive or iterative measurement. In one embodiment, each autofocus measurement includes three measurement parameters, where each measurement parameter includes a lens steps followed by a time delay. For example, the actuator may be caused to move the lens based on a first step of a first measurement parameter. Then a time delay of the first measurement is inserted prior to the actuator moving the lens based on a second measurement parameter, and so on through the multiple measurement parameters. In one embodiment, the time delay between each lens step of a given autofocus measurement is equal. In another embodiment, the lens steps of the measurement parameters remain constant for all autofocus measurements. In an illustrative embodiment, the system is configured to identify which autofocus measurement produced the best performance indicator, and determine the time delay corresponding to that autofocus measurement. Then the system may be configured to determine the ring period as a function of the time delay for that measurement. For example, the ring period may be equal to the time delay multiplied by the number of lens steps (e.g., three).

In another aspect, the damping parameter of a given lens actuation may be determined based on the step size of an autofocus measurement having the best performance indicator. For example, multiple autofocus measurements may be performed by the system where the first lens step of the first measurement parameter is incrementally adjusted between each successive measurement. In one embodiment, each autofocus measurement includes two measurement parameters each having a lens steps with a time delay between each step. In one embodiment, the time delay between each lens step for all autofocus measurements is the same. In another embodiment, the time delay is related to the ring period of the lens vibration due to lens actuation. In another embodiment, the first lens step of the measurement parameters is incrementally adjusted between each autofocus measurement. However, the target distance of the lens actuation may remain the same between each autofocus measurement, thus the subsequent lens steps are adjusted in based on the adjustment to the first lens step. In an illustrative embodiment, the system is configured to identify which autofocus measurement produced the best performance indicator, and determine the first lens step corresponding to that autofocus measurement. Then the system may be configured to determine the damping ratio as a function of the first lens step for that measurement. For example, the best performance indicator corresponds to the best ratio of first lens step over target distance, and the best performance indicator corresponds to the damping ratio.

Various embodiments will be described below in conjunction with the drawings for purposes of illustration. It should be appreciated that many other implementations of the disclosed concepts are possible, and various advantages can be achieved with the disclosed implementations.

FIG. 1 is a graphical representation illustrating an example of vibrations of a lens, in an imaging device, and resulting from movement of a lens by an actuator. The lens is moved from a first position (or displacement) 105 to a second position (or displacement) 110. The imaging sensor utilized with the illustrated lens may capture an image once per image frame time, illustrated by time period 115. When moving from the first position 105 to the second position 110, an oscillation or lens vibration 125 may occur that results in rapid changes in the displacement of the lens, as illustrated in FIG. 1. FIG. 1 also shows a lens stabilization time 120. Vibrations introduced to the lens during movement may settle over a lens stabilization time (period) 120 such that the amount of lens displacement decreases to small amount, and the lens may accurately (for example, to a certain threshold value) be used to capture an image subsequent to the lens stabilization period 120. The lens stabilization time 120 may be a function of the magnitude of oscillation or vibration 125. If the lens stabilization time 120 exceeds the frame time 115, the capture rate of the imaging sensor may be reduced to provide for lens stabilization. Solutions that can reduce lens stabilization time 120 may therefore reduce the time between when a lens is moved and when an image may be captured.

The lens vibration illustrated in FIG. 1 may be generated in a lens actuator. An actuator, for example a VCM, may include components (for example, springs and movable mechanical structures) that are made to move or vibrate, and such vibration may cause the ring or vibration shown in FIG. 1. As the lens moves, vibration from the actuator may be imparted to the lens. The vibrations resulting from the movement of the lens by the actuator may have an intrinsic ringing angular velocity ($\omega_o$). However, friction between the lens and the lens casing (or some other component) provide a damping mechanism for the vibration; and the small friction gradually reduces the vibration magnitude during the lens movement, as is shown by the decreasing amplitude of the vibration curve 130 in FIG. 1.

The ring (or vibration) curve 130 can be characterized by the following equation, in which displacement of the lens as a function of time, u(t), can be determined as:

$$u(t)=A\{1-e^{-\gamma t}\cos(Kt)\}, K=\sqrt{\omega_o^2-\gamma^2}$$

where A is the distance of the intended lens movement from first position 105 to second position 110, $\gamma$ is the damping ratio of the ring and is related to friction exerted on the lens during lens movement, and $\omega_o$ is the ringing angular velocity. The ringing angular velocity may be characterized as a function of the ring period T. In some embodiments, the ring period $T=2\pi/\omega_o$. The above equation may describe the ring and vibrations generated as a function of $\gamma$ and $\omega_o$. Therefore, solutions seeking to reduce the lens vibrations of curve 130 may have the ring period and damping ratio of at least one imaging device stored in a memory or includes a method to determine actuation characteristics of at least one imaging device, for example the damping ratio and ringing period.

Methods and systems herein, disclose embodiments configured to determine at least one actuation characteristic of lens vibration based on moving a lens by an actuator through multiple measurement parameters. The methods described herein may be performed during a calibration phase of the imaging device during the life of the imaging device. For example, such methods may be performed by the imaging device during manufacture and stored in the memory of the imaging device. These characteristics may be held in the memory for repeated access and usage during damping operations. In another embodiment, the calibration phase may be performed when the imaging device is turned on or operated to ensure an accurate and up-to-date determination of actuation characteristics. In yet another embodiment, the calibration phase may be performed prior to the every image capture operation by a user of the imaging device.

Figure 2:
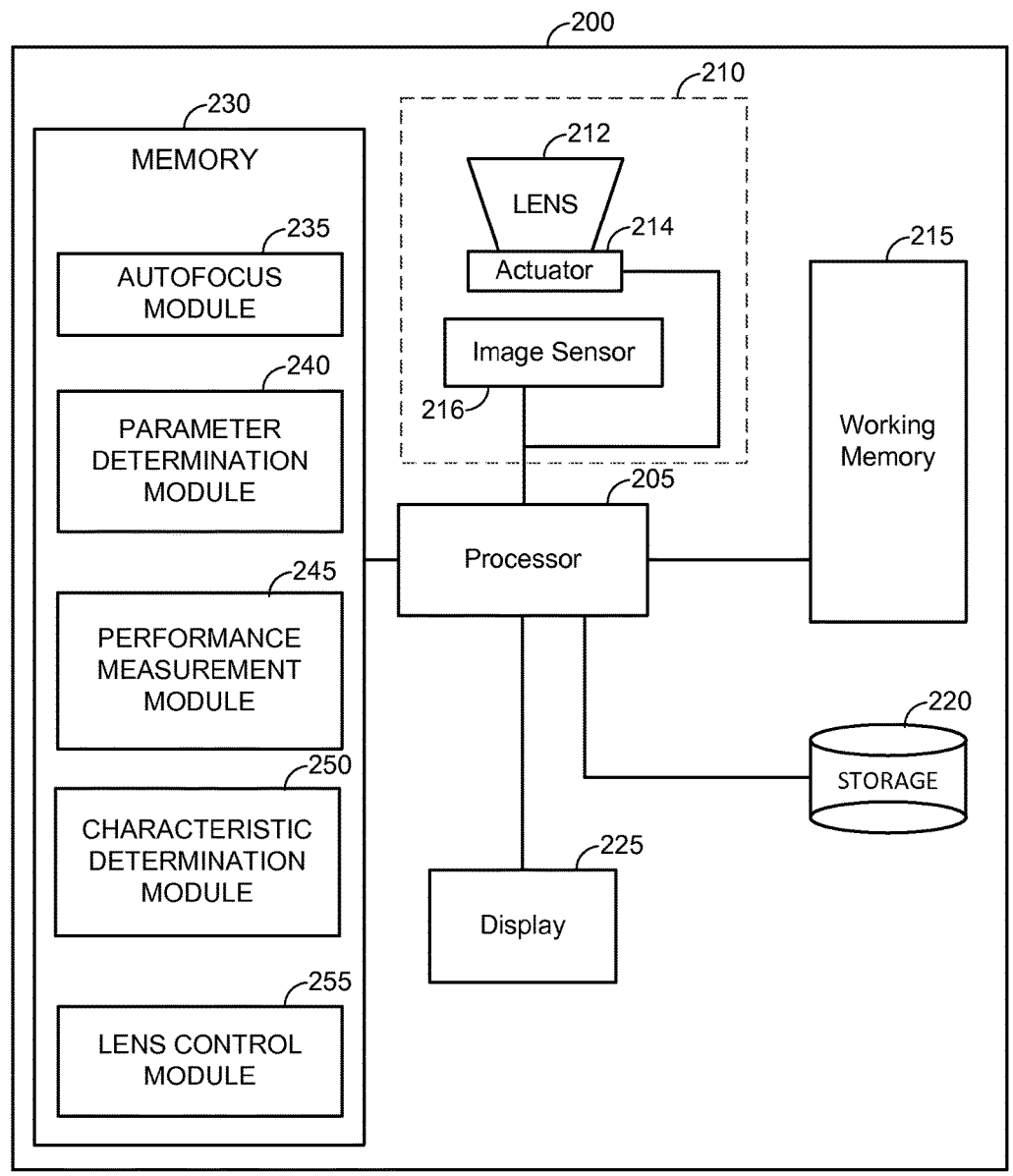
FIG. 2 is a block diagram of an imaging device implementing aspects of some disclosed embodiments.

FIG. 2 is a block diagram of an example of an imaging device according to some embodiments. A person having ordinary skill in the art will appreciated that certain embodiments of the invention may have additional components, fewer components, and/or different components than the example illustrated in FIG. 2. In the illustrated embodiment, imaging device 200 includes a processor 205 which is operably connected to a sensor module 210, working memory 215, storage 220, display 225, and memory 230. The sensor module 210 may include a lens 212, an actuator 214, and an image sensor 216. Light enters the lens 212 and is focused on the imaging sensor 216. In one aspect, the imaging sensor 216 utilizes a charge coupled device. In another aspect, the imaging sensor 216 utilizes either a CMOS or CCD sensor. The lens 212 is coupled to the actuator 214, and is moved by the actuator 214. The actuator 214 is configured to move the lens 212 in a series of one or more lens movements or steps through a displacement range. When the lens 212 reaches a boundary (or limit) of its displacement (or movement) range, the lens 212 or actuator 214 may be referred to as saturated. The actuator 214 may be, for example, a voice coil motor (VCM), Micro-Electronic Mechanical System (MEMS), or a shape memory alloy (SMA), or another device that can move the lens 212 precisely and quickly.

The working memory 215 may be used by the processor 205 to store data dynamically created during operation of the imaging device 200. For example, instructions from any of the modules stored in the memory 230 (discussed below) may be stored in working memory 215 when executed by the processor 205. The working memory 215 may also store dynamic run time data, such as stack or heap data utilized by programs executed on processor 205. The storage 220 may be utilized to store information (e.g., images, data) created by imaging device 220. For example, images captured via lens 212 may be stored on storage 220. The display 225 is configured to display images captured via lens 212 and may also be utilized to implement configuration functions of device 200.

Figure 6:
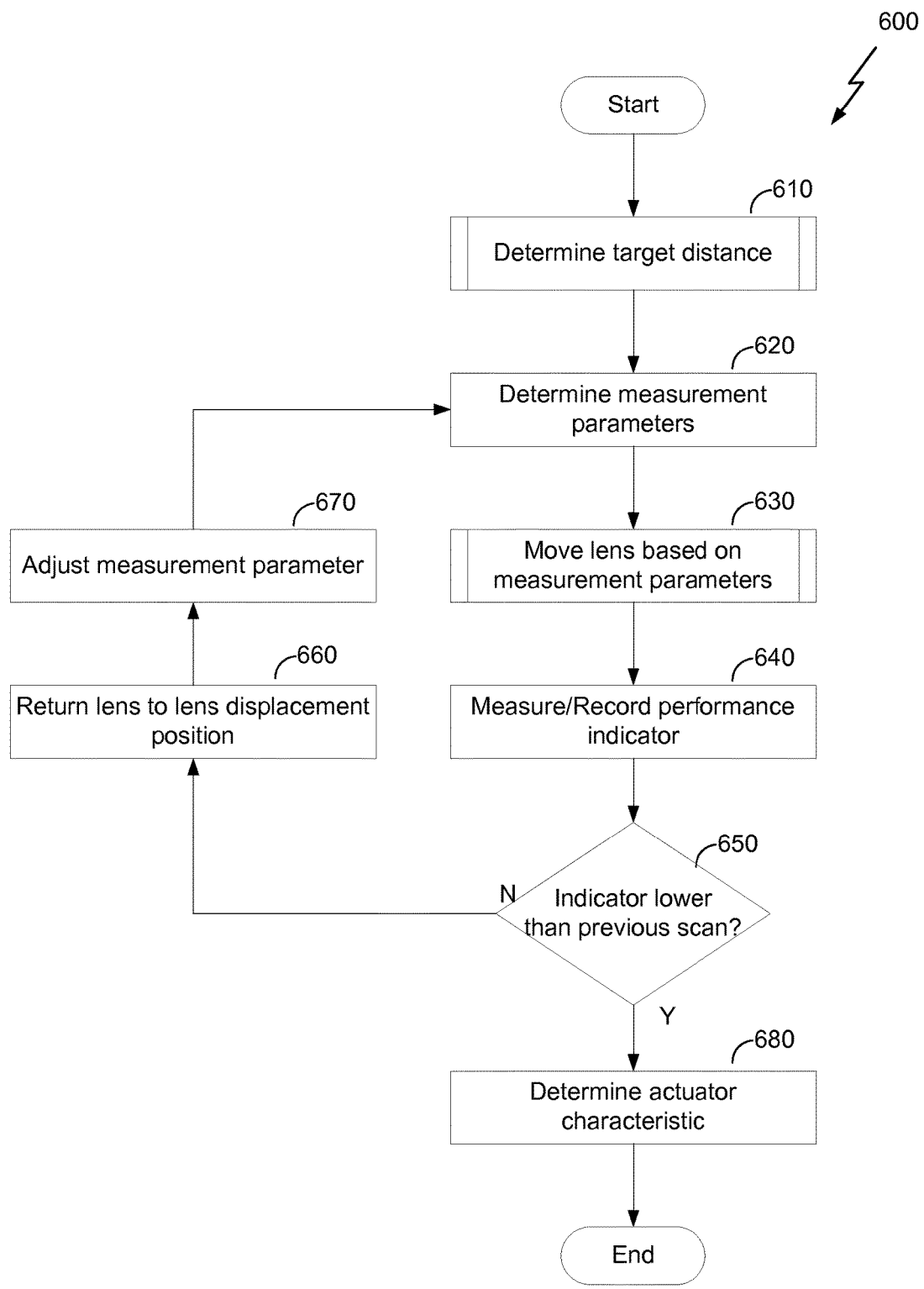
FIG. 6 is a flowchart of a method for determining characteristics in accordance with some embodiments.

The memory 230 may be considered a computer readable media and stores several modules. The modules store data values defining instructions for processor 205. These instructions configure the processor 205 to perform functions of device 200. For example, in some aspects, memory 230 may be configured to store instructions that cause the processor 205 to perform a method 600 or portions thereof, as described below and as illustrated in FIG. 6. In the illustrated embodiment, the memory 230 includes an autofocus module 235, parameter determination module 240, a performance measurement module 245, a characteristic determination module 250, and a lens control module 255.

Still referring to FIG. 2, the autofocus module 235 includes instructions that configure processor 205 to autofocus the lens 212. Instructions in the autofocus module 235 may configure processor 205 to effect a lens position for lens 212. In an embodiment, the instructions in the autofocus module 235 may send the lens position information, along with other input parameters, to the parameter determination module 240. The lens position information may include a current lens position, a target lens position, and/or a focus position. In another embodiment, the autofocus module 235 may send lens position information to the lens control module 255, discussed below. Therefore, instructions in the autofocus module 235 may be one means for generating input parameters defining a lens position and target positions. In some aspects, instructions in the autofocus module 235 may represent one means for determining a current and/or target lens position. Instructions in the parameter determination module 240 or instructions in the lens control module 255 may represent one means for receiving input parameters defining a lens position. In some aspects, instructions in the autofocus module 235 may represent one means for determining a magnitude and/or direction of lens movement based on at least a current and target lens position.

Instructions in the parameter determination module 240 may configure the processor 205 to determine parameters of the actuation of the lens 212, for example multiple measurement parameters for moving lens 212. In some aspects, a movement of the lens 212 may include one or more smaller movements or steps, where the total lens movement corresponds to a total or target distance. In another aspect, the timing between the one or more smaller lens steps may be varied in response to the lens vibration characteristics. Because the measurement parameters vary by lens vibration characteristics and target lens position, the measurement parameters may be based, at least in part, on a current and target lens position of the lens 212.

The parameter determination module 240 may determine the measurement parameters based, at least in part, on one or more parameters stored in memory 230. For example, actuation characteristics may be known when the device 200 is manufactured, for example, based on a model or type of lens 212 and/or actuator 214. Alternatively, a calibration process may be performed during the manufacturing or during operation of device 200, whereby the at least one actuation characteristic of sensor module 210 is determined and stored in memory 215. Therefore, instructions in the parameter determination module 240 may represent one means for receiving characteristics of the actuator and determining the measurement parameters based, at least in part, on at least one actuation characteristics.

Instructions in the parameters determination module 240 (FIG. 2) also may configure processor 205 to determine multiple measurement parameters based, at least in part, on the input parameters generated by autofocus module 235. For example, the measurement parameters may be based on a target lens position of lens 212. The measurement parameters may also be based on the positions through which the lens 212 moves. For example, measurement parameters may specify a lens movement step size and time delay between each step. Therefore, instructions in the parameters determination module 240 may represent one means for determining measurement parameters based, at least in part, on the input parameters from autofocus module 235. Instructions in the parameter determination module 240 may also represent one means for determining at least two lens movement positions based on a current lens position and a target lens position (for example, a desired lens positions to achieve a focus at a certain distance).

In some embodiments, the multiple measurement parameters for each lens movement position may include a time delay. Instructions in the parameter determination module 240 may represent one means for determining a time delay corresponding to the lens movement positions. In some embodiments, the time delay may be based on lens actuation characteristics, e.g., a ringing period and/or a ringing coefficient as detailed above in reference to FIG. 1. In other embodiments, the time delay may be based on predetermined time interval stored in memory 215. Therefore, instructions in the parameter determination module 240 may represent one means for determining measurement parameters based, at least in part, on the input actuation characteristics.

In one embodiment, the instructions in the parameter determination module 240 may send the measurement parameters, along with other input parameters, to the characteristic determination module 250, discussed below. The measurement parameters may include a number of measurement parameters, each including a lens step, a lens step size, a target position, and a time delay. In another embodiment, the parameter determination module 240 may send lens position information to the lens control module 255, discussed below. Therefore, instructions in the parameter determination module 240 may be one means for generating input parameters defining measurement parameters. Instructions in the characteristic determination module 240 or instructions in the lens control module 255 may represent one means for receiving input parameters defining measurement parameters. In some aspects, instructions in the parameter determination module 240 may represent one means for determining a magnitude and/or direction of lens movements based on at least a current and target lens position.

Instructions in the lens control module 255 configure processor 205 to move the lens 212. In some embodiments, the lens control module 255 includes instructions to move the lens 212 based on input measurement parameters received from instructions included in the parameter determination module 240. In other embodiments, the lens control module 255 includes instruction to move the lens 212 based on input lens positions received from instructions included in autofocus module 235. Therefore, lens control module 255 may represent one means for receiving input measurement parameters and lens positions. In some embodiments, instructions included in lens control module 255 configure the processor 205 to cause the actuator 214 to move the lens 212 a distance based, at least in part, on the input lens positions or measurement parameters. Therefore, instructions in the lens control module 255 represent one means for moving the lens based on the measurement parameters to determine actuation characteristics.

The performance measurement module 245 includes instructions that configure processor 205 to measure at least one performance indicator for each successive measurement, where each measurement is based on multiple measurement parameters. In this regard, instructions included in the performance measurement module 245 may configure the processor 205 to capture an image of the light focused on the imaging sensors 216. Instructions in the performance measurement module 245 may configure the processor 205 to receive measurement completion instructions from the lens control module 255 and the parameter determination module 240 indicating the completion of a lens movement based on the multiple measurement parameters related to a given measurement. Based, at least in part, on the completion of the lens movement, the processor 205 can be configured to capture the image for the measurement per instructions from performance measurement module 245. Therefore, performance measurement module 245 may represent one means of receiving measurement completion instructions and capturing an image. In another embodiment, the completion instructions may be received by any of the modules of memory 230, and is not limited to those disclosed herein. Further, any module of memory 230 may include instructions to capture an image. These functions are not limited to the performance measurement module 245. The image, based on instructions from the module of memory 230, may be stored in working memory 215 and/or storage 220 for retrieval and reference by a processor configured by the modules of memory 230.

Still referring to FIG. 2, in an illustrative embodiment, the performance measurement module 245 includes instructions that configure processor 205 to measure at least one performance indicator based on the captured image. In some embodiments, the performance measurement module 245 may configure processor 205 to access the image from working memory 215 and/or storage 220. In some embodiments, the performance indicator is a contrast value or measurement of the captured image. The contrast value may relate to the sharpness of the edges of features contained in the image, which is indicative of the quality of the focus and the effect the lens vibration may have on the focus quality. Therefore, instructions in the performance measurement module 245 represents one means for measuring the performance indicator or contrast value of an image. In another embodiment, the processor 205 may be configured by the performance measurement module 245 to record the performance in working memory 215 and/or storage 220. The performance indicator may be associated with a specific measurement. In this way, the performance indicator may be associated with a particular first measurement parameter of a measurement, the first measurement parameter having a first step size ($a_0$) and/or a first time delay ($t_1$).

In some embodiments, the performance measurement module 245 may send performance information to the characteristic determination module 250, discussed below. Therefore, instructions in the performance measurement module 245 may represent one means for generating input performance information defining the current performance of the autofocus system based on current measurement. In some aspects, instructions in the characteristic determination module 250 may represent one means for receiving input performance indicators based on the current measurement, measurement parameters, current lens position, target lens positions, and focus position.

Instructions in the characteristic determination module 250 may configure processor 205 to determine characteristics of the lens vibration, based, at least in part, on the measurement parameters determined in the parameter determination module 240. In some embodiments, instructions in the characteristic determination module 250 configure the processor 205 to determine actuation characteristics based on input parameters defining a target lens position, generated by the autofocus module 235. In some aspects, the actuation characteristics may be determined based on the measurement parameters, including lens movement direction, lens movement magnitude, and lens movement time period. The direction and magnitude may be based, at least in part, on the current and target lens position. The actuation characteristics may also be determined based on amount of time to effectuate a lens movement. In some aspects, instructions in the characteristic determination module 250 includes instructions to determine the actuation characteristics based, at least in part, on performance indicators of a captured image from the performance measurement module 245. Therefore, instructions in the characteristic determination module 250 may represent one means for determining actuation characteristics, based, at least in part, on the input parameters and on performance indicators.

In some embodiments, characteristic determination module 250 may include instructions to configure processor 205 to determine the ringing angular velocity (or ring period) or damping ratio of the lens vibration due to moving lens 212 by the actuator 214 and/or sensor module 210. Characteristic determination module 250 may include instructions to perform a calibration phase and evaluate the lens vibration to determine the characteristics. In another embodiment, the characteristics may be known and stored in memory 215 and/or storage 220 during manufacturing of the device.

In some embodiments, characteristic determination module 250 may include instructions to configure processor 205 to retrieve at least one actuation characteristic. In some embodiments, at least one actuation characteristics (e.g., ring period) may be needed to determine another actuation characteristic (e.g., damping ratio), and such may be stored in the working memory 215 and/or storage 220 for use in the determination. Therefore, instructions in the characteristic determination module 250 may represent one means of receiving inputs parameters defining actuation characteristics.

Figure 3:
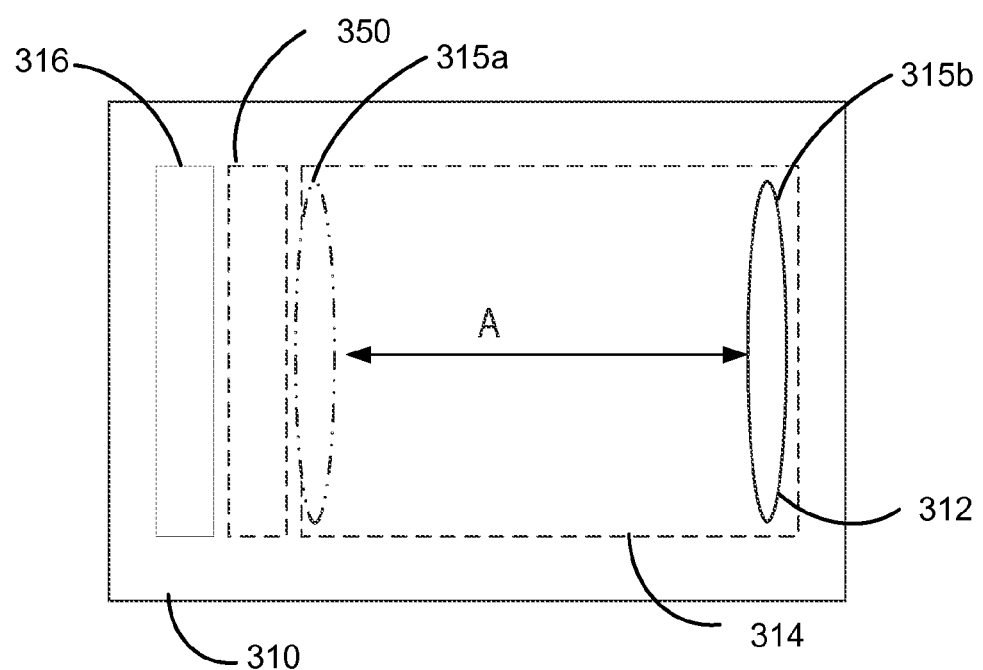
FIG. 3 is a block diagram of a sensor module implementing a characteristic determination in accordance with some embodiments.

FIG. 3 is a schematic illustrating a sensor module 310 that may be used to determine actuation characteristics in accordance with one embodiment. FIG. 3 illustrates a block diagram of sensor module 310 which may be configured to implement lens movements, as described herein. FIG. 3 illustrates an initial position 315a of a lens 312 and a target position 315b of the lens 312. In one embodiment, the target position 315b may be a focus position. The focus position may be based on the scene the imaging device is capturing or based on an object therein. The object or scene may be any scene selected, and need not be any specific object so long as the imaging device is capable of focusing on the object. In another embodiment, the target position 315b may be at a distance of "A" from initial position 315a, as illustrated in FIG. 3. In this way, the target distance may be a distance of A.

The schematic illustrated in FIG. 3 shows a block diagram of a sensor module 310 implementing at least a portion of the disclosed embodiments. Sensor module 310 may be implemented, for example, in accordance with sensor module 210 as detailed above in reference to FIG. 2. Sensor module 310 may include an autofocus component 314 and an image sensor 316. Mounting space 350 in the sensor module 310 may be a cavity at least partially between the lens 312 and the image sensor 316. Image sensor 316 may be implemented in accordance with image sensor 216 as detailed above in reference to FIG. 2. Autofocus component 314 may include a lens 312 having an initial position 315$a$ and a target position 315$b$. Target position 315$b$ may be the focus position in accordance with the disclosed embodiments, for example, the position of the lens where the lens best focuses a target scene on the image sensor 316. The sensor module 310 is configured such that lens 312 focuses light that enters the sensor module 310 on the image sensor 316. The mounting space 350 is a region in the sensor module 310 for mounting components (e.g., mechanical, electrical) which may be used for autofocus operations. For example, in some embodiments, mounting space 350 may hold brackets and other support for mounting the autofocus component. Mounting space 350 may provide area for brackets and other mounting means for mounting image sensor 316. Accordingly, the mounting space 350 may include one or more components to increase structural integrity of the autofocus component 314, lens 312 and image sensor 316 and be dimensioned (or configured) to allow an image to focus on image sensor 316 and maintain alignment along the optical axis of lens 312.

The lens 312 may be moved by autofocus component 314, which has a displacement range. The autofocus component may be an actuator in accordance with actuator 214 as described above in reference to FIG. 2. Autofocus component 314 may be configured to receive instructions from autofocus module 235 and processor 205 to focus lens 312, as described above in reference to FIG. 2. In some embodiments, the instructions in autofocus module 235 may send lens position information, along with other input parameters, to parameter determination module 240. The lens position information may include an initial lens position 315$a$ and a target lens position 315$b$. Therefore, instructions in autofocus module 235 may be one means for generating input parameters defining a lens position in sensor module 310.

Instructions in parameter determination module 240 of FIG. 2 configure the processor 205 to determine measurement parameters of lens 312. Parameter determination module 240 may include further instructions to transmit the measurement parameters to performance measurement module 245. In some aspects, a movement position of the lens may include one or more positions corresponding to different steps. For example, instructions from parameters determination module 240 can be included to break up or divide the lens movement to target position 315$b$ into two or more smaller lens movements or steps. The parameters determination module 240 may provide instructions as to divide the movement of lens 312 to target position 315$b$ into a multiple lens steps, where the instructions may be based at least in part on actuation characteristic sought to be determined by the characteristics determination module 250, For example, where the imaging device is determining the ringing period, the parameter determination module 240 may provide instructions to divide target distance A to target position 315$b$ into three measurement parameters having three discrete steps. In another embodiment, where the imaging device is determining the damping ratio, the parameter determination module 240 may provide instructions to divide target distance A to target position 315$b$ into two discrete steps.

FIGS. 4A-4E are graphs illustrating examples of method of determining a ring period in accordance with some embodiments. The FIGS. 4A-4E represent lens position curves 410$a$-$e$ plotted over time. Curves 410$a$-$e$ may be the result of moving a lens, in an imaging device, from an initial position 420 to a target position 405 (e.g., focus position), located a distance A from the initial position, through multiple (for example, three) measurement parameters, the measurement parameters include lens steps $a_0$, $a_1$, and $a_2$. As shown in the FIGS. 4A-4E, the imaging device may move the lens off of the target position 405 prior to running, thus the system must wait for any lens vibration (seen in curve 420) to settle prior to moving the lens again. In another embodiment, the target position 405 may be the focus position of the imaging device based on the object being focused upon. In some embodiments, the imaging device may be substantially similar to the one described in FIG. 2 and/or FIG. 3.

FIGS. 4A-4E together illustrate an example of a single scan sequence including multiple autofocus operations or measurements. Each of the FIGS. 4A-4E illustrate a single iterative measurement where the imaging device moves a lens from the initial position 420 to a focus position 405. In one embodiment, the imaging device achieves the focus position 405, without calibration, after waiting a long period of time for any ringing of the lens, due to a change in position, to settle. Once the lens ringing has settled at the position 405, then the imaging device may be configured to move the lens off of position 405 by a distance of "A" to position 420. At this time, the imaging device waits for any ringing of the lens to settle. Each iterative measurement may include different measurement parameters (e.g., the lens movement distances or time delay between lens movements may be varied between each measurement) such that variations in the quality of the focus operation occur between each autofocus operation. The quality of each focus operation (e.g., a performance indicator) between iterative measurements may be determined at the completion of each autofocus operation or measurement. The performance indicator of successive iterative measurements may then be compared and the characteristics of the lens vibration imparted onto the lens due to movement by the actuator may be derived based on the iterative measurement having the best performance indicator.

Figure 10:
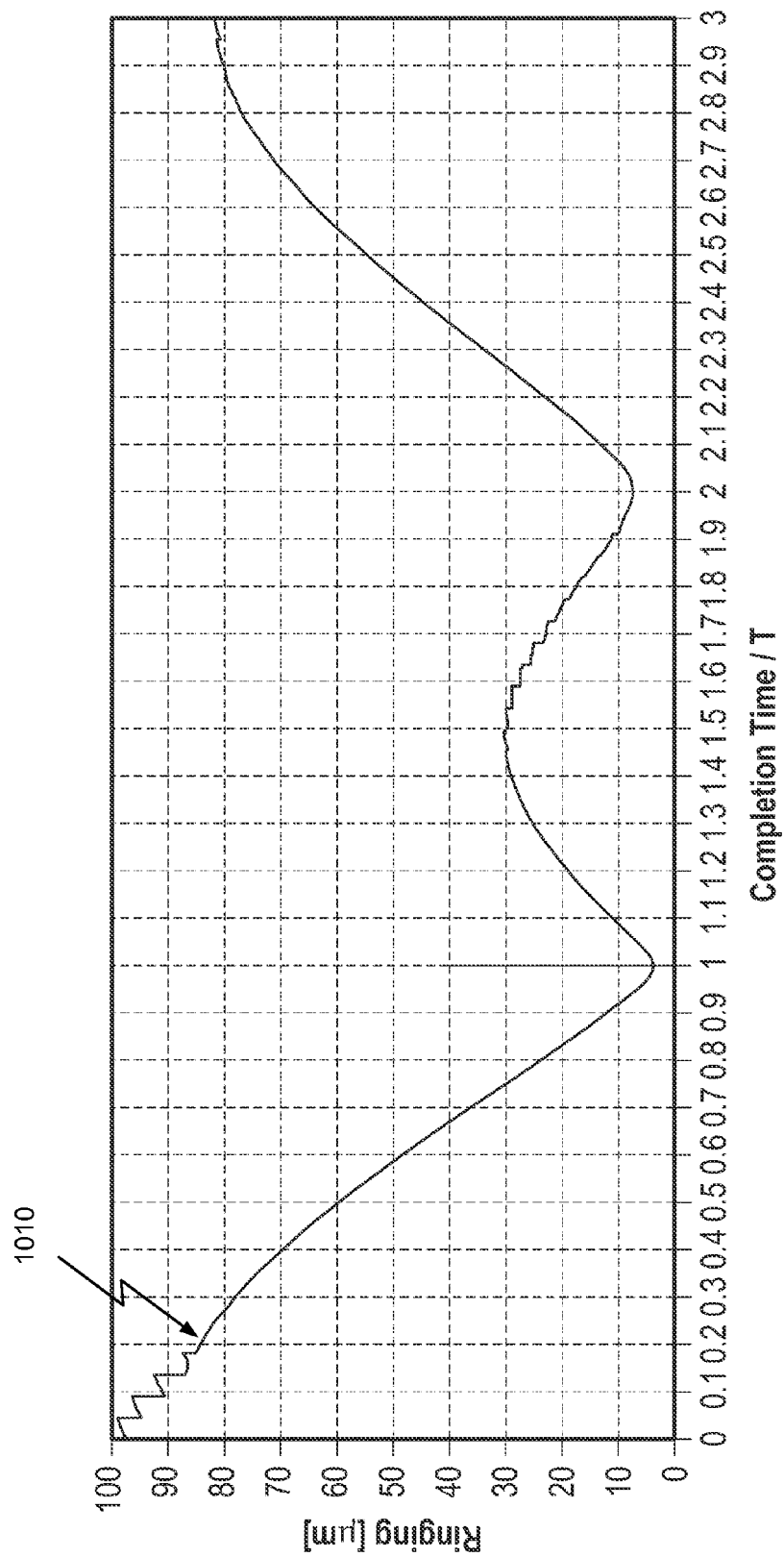
FIG. 10 is a graphical representation of using a three lens step measurement for measuring the ring period in accordance with some embodiments.

FIGS. 4A-4E further illustrate the use of three lens movement steps, e.g., a three-step approach, where the three steps are shown as $a_0$, $a_1$, and $a_2$. One non-limiting advantage of this method to determine the ring period (T) of the system is that this method is not influenced by the damping ratio of the imaging device. Thus, there is no need to determine the damping ratio before determining the ring period. The three step approach provides a ringing magnitude, in micrometers, versus completion time over ring period that has two troughs, as shown in FIG. 10. The first trough always occurs at the ring period, independent of the damping ratio. FIG. 10 illustrates an exemplary graph having a damping ratio ($\gamma$) of $0.035\omega_0$, but the location of the trough at a value corresponding to the ring period will occur regardless of the damping ratio of the imaging device.

Figure 4A:
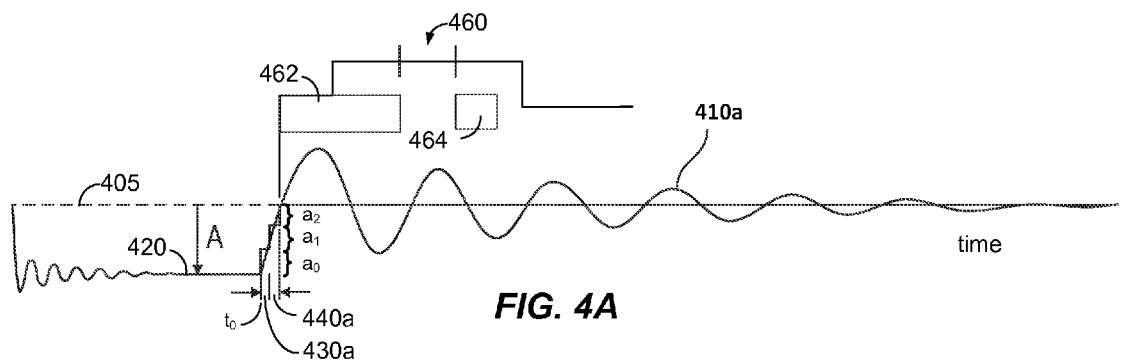
FIGS. 4A-4E illustrates the method of determining a ring period in accordance with some embodiments.
Figure 4B:
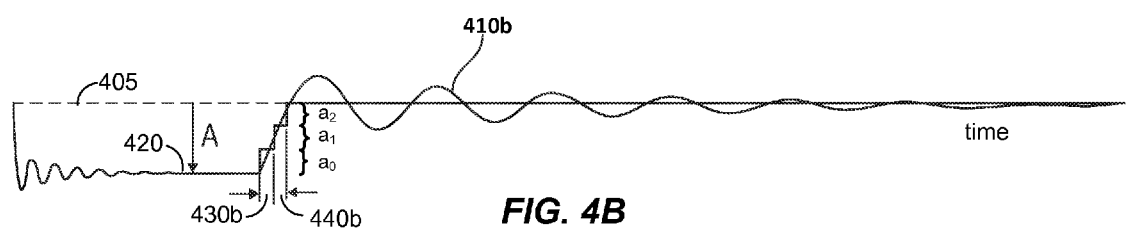

Referring to FIG. 4A, moving the lens by each step, $a_0$, $a_1$, and $a_2$, causes lens vibration associated with each lens step, which is characterized by the formula discussed in reference to FIG. 1. For example, the lens 312 of FIG. 3 may be located at initial position 420. The measurement method disclosed herein may be initialized and at a time $t_0$, the actuator may be instructed or commanded to move the lens by step $a_0$, however at $t_0$ the lens remains at the initial position. At a time subsequent to receiving the command, the actuator may cause the lens to be moved a first step over a distance of $a_0$. The movement of distance $a_0$ may result in a lens vibration associated with the moving of the lens by the actuator. After the moving of the lens by step $a_0$, a time delay of 430a ($t_1$) of the first measurement parameter is inserted and the system waits a time period equal to time delay 430a. After time delay 430a at time $t_1$, the actuator may be instructed or receive a command to move the lens by step $a_1$, however at time $t_1$ the lens is moving, either due to actual movement by the actuator or due to ringing imposed on the lens, thus the actual position of the lens is uncertain. At a time subsequent to receiving the command at time $t_1$, the actuator may cause the lens to be moved a second step over a distance $a_1$. The movement of step $a_1$ may result in a lens vibration associated with moving the lens by the actuator. After moving the lens by step $a_1$, a time delay of 440a ($t_2$) of the subsequent or second measurement parameter is inserted and the system waits a time period equal to time delay 440a. After time delay 440a at time $t_2$, the actuator may be instructed or receive a command to move the lens by step $a_2$, however, at time $t_2$, the lens is moving, either due to actual movement by the actuator or due to ringing imposed on the lens by either previous lens movements, thus the actual position of the lens is uncertain. At a time subsequent to receiving the command at time $t_2$, the actuator may cause the lens to be moved a third step $a_2$ to the target or focus position 405, however the actual position of the lens is uncertain due to the ringing imposed on the lens.

In one embodiment, the time delay 430a selected in FIG. 4A may be set to a minimum unit (or duration) of time, and the time delay 440a is set to be substantially equal to time delay 430a. In another embodiment, the steps $a_0$, $a_1$, and $a_2$ are equal, where each is equal to the target distance A divided by the number of measurement parameters, in this instance there are three measurement parameter groups, defined by, at least, $a_0$ as a first group, $a_1$ and $t_1$ as a second group, and $a_2$ and $t_2$ as a third group. In moving the lens through the steps $a_0$, $a_1$, and $a_2$, a lens vibration associated with each movement is imparted onto the lens and the combination of the individual lens vibrations results in combined vibration 410a. At the time delay 440a, after moving the lens toward the focus position, an exposure period 462 of VSYNC 460 is initiated to capture an image. Exposure period 462 may be fairly long as compared to the ring period, and therefore the first peak and trough of the lens ringing curve 410a may affect the image quality. After the exposure period 462 is completed, the image can be captured and a performance indicator of that image is measured during calculation period 464. However, due to the combined vibration 410a, the lens may not be stable at position 405, thus affecting the exposure and subsequent image capture, and therefore the image may not be perfectly focused resulting in a first performance indicator. In some embodiments, during period 464 and after the performance indicator is determined, the imaging device may wait a period of time long enough for the ringing to settle and another image can be captured to ensure the focus (e.g., contrast value) is acceptable. If the focus is not acceptable, the imaging device may repeat the autofocus without calibration, to correct a situation where the lens position may have drifted away from the focus position. In other embodiments, during period 464 the lens may be moved back to position 420 by the autofocus module 230 or lens control module 255 of FIG. 2, for preparation of a subsequent measurement, for example the measurement illustrated in FIG. 4B. In one embodiment, the performance indicator is a contrast measurement of the captured image, whereby the contrast relates to the sharpness of the features of the image. The contrast value relates to the quality of focus of the imaging device, and the lower the contrast value the further away from focus the lens is positioned. Thus, a large curve 410a may represent a small or poor contrast value.

FIGS. 4B-4E represent subsequent iterative measurements (e.g., autofocus operations), whereby the process described in reference to FIG. 4A is repeated. However, in each successive measurement of FIGS. 4B-4E, the time delay $t_1$ is incrementally increased, thereby sweeping the time delay $t_1$ through multiple time delays $t_1$ where each time delay $t_1$ corresponds to an individual measurement represented by one of FIGS. 4B-4E. Thus, the total time for moving the lens 312 the target distance A is increased and the target distance A remains unchanged. In one embodiment, the steps $a_0$, $a_1$, and $a_2$ do not change between successive measurements. After each measurement shown in FIGS. 4B-4E, the performance indicator is captured. Thus, time 430b and 440b produce a combined lens vibration curve 410b that is smaller in magnitude than produced by the measurement represented in FIG. 4A. Thus, the performance indicator of FIG. 4B will be larger than that of FIG. 4A. The larger performance indicator suggests the imaging device is more accurately focusing on the object. The imaging device then repeats the process in FIG. 4C having time delays 430c and 440c, producing lens vibration curve 410c. Again, the curve 410c is smaller than previous measurement in FIG. 4B, thus producing a larger performance indicator suggesting a better focus on the object. The process is repeated again in FIGS. 4D and 4E producing curves 410d and 410b, respectively, having associated performance indicators.

Figure 4C:
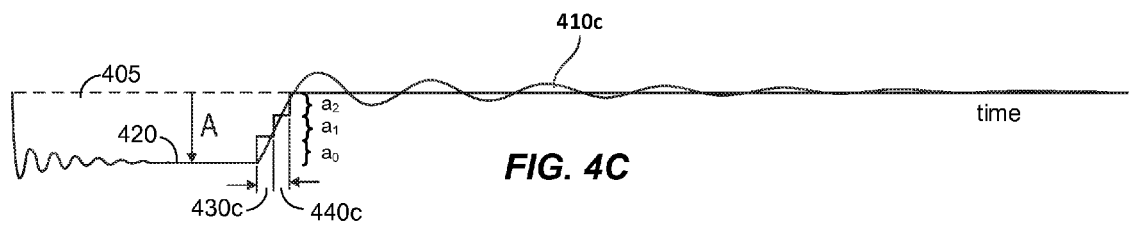
Figure 4D:
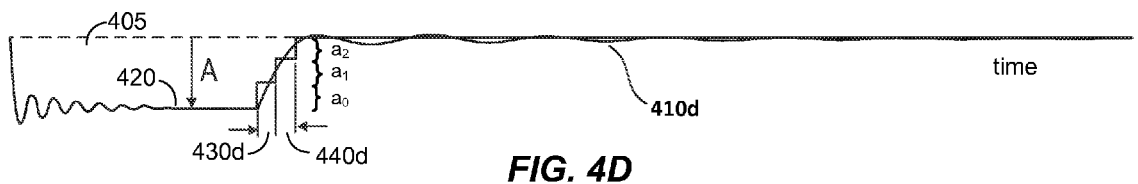
Figure 4E:
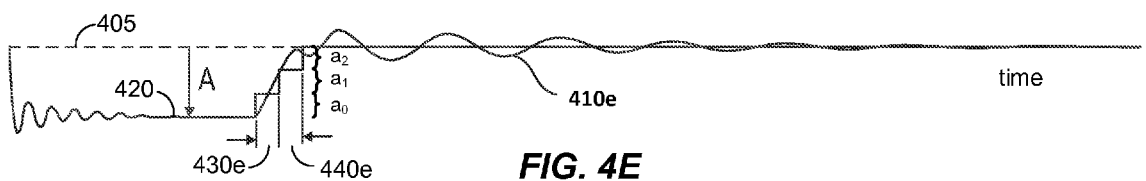

As seen in FIG. 4D, the combined vibration curve 410d is the smallest as compared to the vibration curves of the FIGS. 4A-4E. Thus, the performance indicator of the measurement illustrated in FIG. 4D will be the largest and the captured image the best focused as compared to the other FIGS. 4A-4E. In one embodiment, this is due to how the lens vibrations of each lens step are combined. In FIG. 4D, the individual vibrations combine in a way as to, at least partially, cancel each other out, thereby minimizing the overall vibration imparted onto the lens. Whereas, in the FIGS. 4A-4C and 4E, the individual vibrations affect each other and modify the overall vibration curve, but do not cancel out or minimize the vibrations imparted on the lens as well as compared to FIG. 4D.

In one embodiment, the incremental increase in the time delay between each step may be large or rough, thereby enabling the imaging device to cover the entire range of the actuator in a short period of time. After the highest performance indicator for a given scan sequence is located using a large or rough increment, the imaging device may adjust the incremental change of each time delay, thereby enabling a more precise scan sequence in a smaller region of actuator displacement to locate the overall best performance indicator. For example, the time delay may be incremented by a large change in the time delay $t_1$ until the imaging device detects a decrease in the performance indicator between successive measurements. Once the decrease is detected, the imaging device may continue with a subsequent scan sequence, where the increment change to the time delay $t_1$ is smaller than the change in the time delay $t_1$ of the previous scan sequence (e.g., the increment applied to the time delay $t_1$ of successive measurements can be ⅓, ⅕, or any fraction of the change in the time delay $t_1$ of the previous scan sequence). In some embodiments, the time delay $t_1$ of the first measurement for the subsequent scan sequence may be one of the time delays of any measurement of the first scan sequence. For example, the time delay of the first measurement for the second scan sequence may be equal to the time delay $t_1$ used in FIG. 4C, where FIG. 4C is one of the measurements of a first scan sequence. In another embodiment, a third scan sequence may be performed having an even smaller time delay incremental change than the second scan sequence. The imaging device may perform multiple scan sequences until a target or optimal ring period (T) is determined. In some embodiments, the lens may be moved in either the same direction as the lens was moved in the preceding scan sequence or may be moved in a direction opposite of the lens movements of the preceding scan sequence. Further, subsequent scan sequences may be possible if the first measurement parameter of the previous scan sequence is greater than the maximum resolution of the measurement. As will be described in greater detail in reference to FIG. 10, in the three-step approach described above and illustrated by FIGS. 4A-4E there are two ring period troughs (e.g., where the smallest ringing and greatest contrast indicator occur). Thus, a scan sequence may become trapped in the second trough, located approximately at twice the optimal ring period, if the incremental change to the time delay $t_1$ is too large, thus the system may incorrectly sweep across both troughs.

Once the imaging device determines the best focus, e.g., the largest performance indicator, the imaging device may determine the ring period. In one embodiment, in reference to FIG. 2, the characteristics determination module 250 may include instructions to configure the processor 205 to determine the characteristics of the actuator, e.g., the ring period, based on inputs received from the performance measurement module 245 and parameter determination module 240. In one embodiment, the processor 205 can be configured to determine the ring period based on the time delay $t_1$ having the largest performance indicator value. In the embodiment depicted in FIGS. 4A-4E, the algorithm may determine the ring period (T) to be three times the time delay $t_1$ of the measurement having the largest performance indicator. For example, in the time delay 430d of the measurement shown in FIG. 4D produced the largest contrast value of the measurements shown in FIG. 4A-4E. Therefore, the ring period of an imaging device used to produce FIGS. 4A-4E may be determined to be three times the time delay 430d.

FIGS. 5A-5E are graphs illustrating an example of a method of determining a damping ratio in accordance with one embodiment. FIGS. 5A-5E illustrate a method to measure the damping ratio, where the ring period has been previously determined and is considered to be the optimal ring period. In one embodiment, the ring period has been previously determined in accordance with the embodiment described with reference to FIGS. 4A-4E. FIGS. 5A-5E are similar to FIGS. 4A-4E, however curves 510a-e may be the result of moving a lens from an initial position 520 and to target position 505 through multiple (e.g., two) measurement parameters, having lens steps $a_0$ and $a_1$. In some embodiments, the target position 505 is the focus position. In one embodiment, the step size of $a_0$ and $a_1$ need not be equal. The imaging device may be substantially similar to the one described in FIG. 2 and/or FIG. 3. In the embodiment shown in FIGS. 5A-5E, the time delay between steps $a_0$ and $a_1$ is unchanged. In another embodiment, the ring period is predetermined and may be stored in the memory of the imaging device for access, for example, by the parameter determination module 240 of FIG. 2. In another embodiment, the time delay $t_1$ between $a_0$ and $a_1$ is one half of the ring period (e.g., T/2) determined in accordance with the embodiment described with reference to FIGS. 4A-4E using a three-step approach. The method approach of FIGS. 4A-4E used to determine the ring period is not influenced by the damping ration determined herein. In another embodiment, the time associated with moving the lens through steps $a_0$ and $a_1$ to target position 505 is equal to the ring period.

In reference to FIGS. 5A-5E, the lens 312 (FIG. 3) may be located at initial position 520. The measurement method disclosed herein, may be initialized and the actuator may cause the lens to be moved a first step a distance $a_0$. In one embodiment, the first measurement shown in FIG. 5A includes a first measurement parameter where the step $a_0$ is equal to one half the target distance, thus $a_1$ is also equal to one half the target distance. The movement of the lens by a distance $a_0$ produces a lens vibration. After the moving of the lens by step $a_0$, time delay 530 is inserted and the system waits. At time 530a, the actuator may cause the lens to be moved a second distance $a_1$. The movement of the lens a distance $a_1$ also causes a lens vibration. The lens vibration associated with each movement is imparted onto the lens and the combination of the individual lens vibrations results in combined vibration 510a. Similar to FIGS. 4A-4E, after moving the lens to the focus position in FIG. 5A a performance indicator of that image is measured.

Figure 5A:
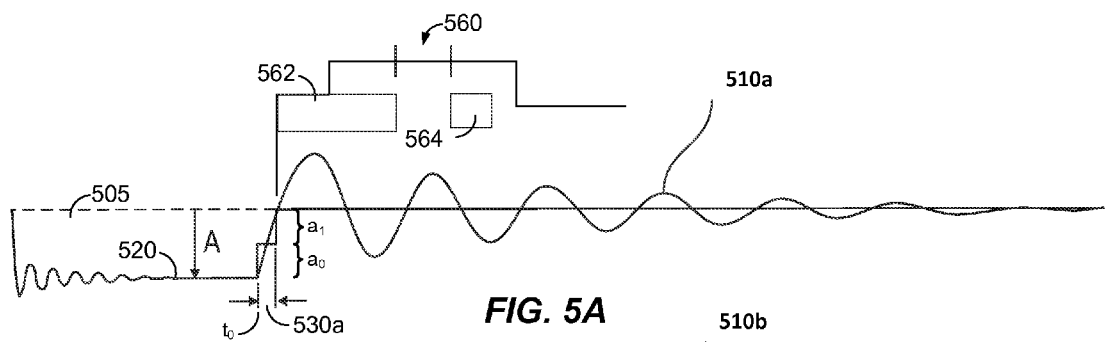
FIGS. 5A-5E illustrates the method of determining a damping ratio in accordance with some embodiments.
Figure 5B:
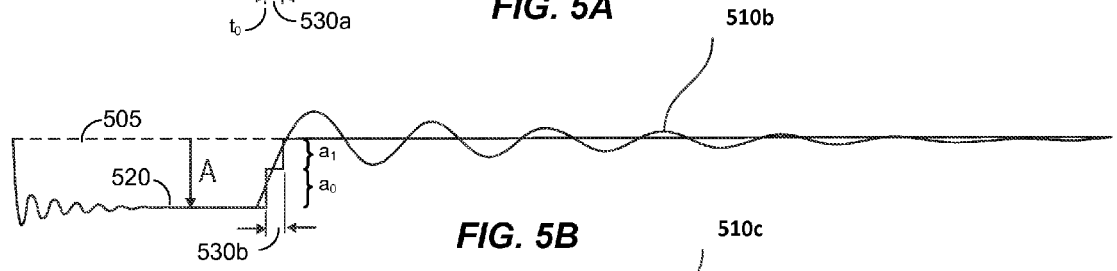
Figure 5C:
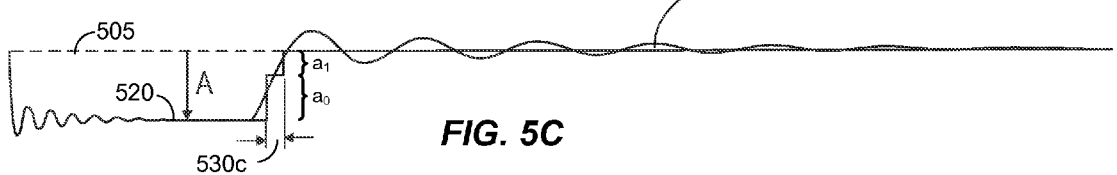
Figure 5D:
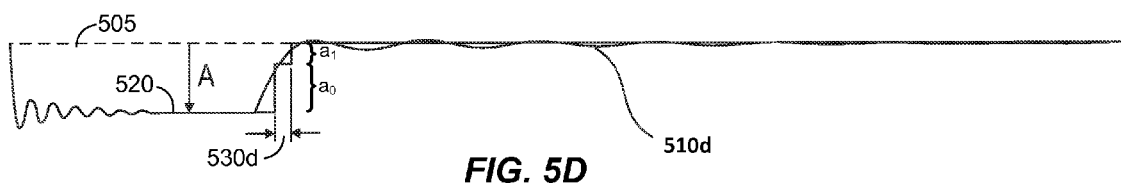
Figure 5E:
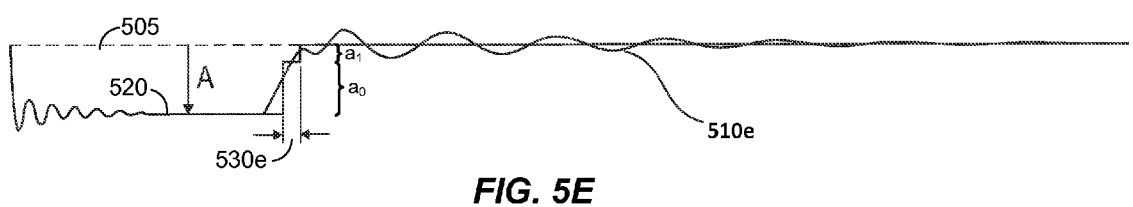

FIGS. 5B-5E, similar to FIGS. 4A-4E, represent iterative measurements, whereby the process described in reference to FIG. 5A is repeated for each successive measurement. However, in each measurement of FIGS. 5B-5E, the step size $a_0$ is incrementally increased while the target distance remains unchanged, thereby decreasing step size $a_1$. After all the lens movements have occurred for a given measurement, the exposure period 562 is initiated, thereby enabling the capture of an image. The image may be affected by the peaks and trough of the lens vibration imparted onto the lens by the lens movements. After each image is captured in FIGS. 5B-5E, the performance indicator is determined for each successive measurement during calculation period 564, such that the performance indicator varies between the different measurements shown in FIGS. 5A-5E having different step size $a_0$. Similar to FIGS. 4A-4E, the larger performance indicator suggests the system is closer to a better focused image.

In one embodiment, the incremental increase in the step size $a_0$ may be large or rough, thereby enabling an imaging device to cover the entire range of the actuator efficiently and quickly. After the highest performance indicator for a given scan sequence (e.g., FIGS. 5A-5E taken together) is located using a large or rough increment, the imaging device may adjust the increment change between each step size, thereby enabling a more precise scan sequence in a smaller region of actuator displacement to locate the overall best performance indicator. For example, for a first scan sequence the step size may be increased by a first increment amount for each successive measurement until the imaging device detects a decrease in the performance indicator. Once the decrease is detected, the imaging device may continue with a subsequent scan sequence, where the increment amount to the step size is smaller than the increment amount of the first scan sequence. In some embodiments, the lens may be moved in either the same direction as the lens movements of the preceding scan sequence or may be moved in a direction opposite as the lens movements of the preceding scan sequence. Further, subsequent scan sequences may be possible if the first parameter of the previous scan sequence is greater than the maximum resolution of the measurement.

Once the imaging device determines the best focus, e.g., the largest performance indicator, the system may determine the damping ratio. In some embodiments, the ring period should be known and accurate to facilitate the determination of the damping ratio, for example due to a prior scan sequence, such as the scan sequence illustrated in FIGS. 4A-4E. In one embodiment, with reference to FIG. 2, the characteristics determination module 250 may include instructions to configure the processor 205 to determine the characteristics of the actuator, e.g., the damping ratio, based on inputs received from the performance measurement module 245 and parameter determination module 240. In one embodiment, the processor 205 can be configured to determine the damping ratio based on the step size $a_0$ of the measurement having the largest performance indicator value. In the embodiment depicted in FIGS. 5A-5E, the algorithm may determine the ratio of the damping ratio to the angular velocity ($\gamma/\omega 0$) to be the step size $a_0$ having the largest performance indicator over the target distance, e.g., $a_0/A$. For example, in the step size $a_0$ of the measurement shown in FIG. 5D produced the largest contrast value, e.g., smallest combined vibration 510d, of the measurements shown in FIG. 5A-5E. Therefore, the damping ratio of an imaging device used to produce FIGS. 5A-5E may be determined to step size $a_0$ of FIG. 5D divided by the target distance A.

FIG. 6 is a flowchart of an example of a method for determining characteristics of an actuator in accordance with one embodiment. Process 600 may be performed by imaging device 200, illustrated in FIG. 2. Process 600 may represent a single scan sequence. In some embodiments, the method of determining characteristics of an actuator may be performed during a calibration phase, for example, during manufacturing of the imaging device, during a power on phase of the imaging device, or prior to the operation of the imaging device. The method can be implemented as a process by the memory 230 or implemented elsewhere in the imaging device 200, for example one or more processors executed by logic device in processor 205.

Process 600 starts at a start block and then moves to process block 610, where the target distance is determined. In some embodiments, a target distance may be determined by instructions included in the autofocus module 235 of FIG. 2 related to movement of the lens. The target distance may be based, in part, on the focus position and the starting position of the lens. The focus position and/or target distance may be stored in working memory 215 and/or storage 220, and may be accessed by processor 205 based on instructions from autofocus module 235, described in reference to FIG. 2. In other embodiments, the imaging device may determine the target distance as will be explained in further detail below with reference to FIG. 7.

After the target distance and focus position is determined, the process 600 moves to block 620 for each iterative measurement (e.g., FIGS. 4A-4E or FIGS. 5A-5E), where multiple measurement parameters are determined for the instant measurement. In some embodiments, each successive measurement includes at least a first and subsequent measurement parameter. In one embodiment, each measurement parameter includes a step size for each lens movement. In another embodiment, the step size for a first measurement parameter is set to the target distance divided by the number of lens movement steps, for example two steps or three steps. The number of steps may be based, at least in part, on the characteristics being determined. For example, as discussed above, in some embodiments, to determine the ring period three lens steps are used, and these step sizes remain unchanged throughout the process. However, in some embodiments, to determine the damping ratio two lens steps are used, which may be changed between each measurement.

In another aspect, each measurement parameter includes at least one time delay to be inserted between successive lens movement. In one embodiment, the time delay is unchanged between each measurement, thereby ensuring the time to effectuate the entire lens movement through the target distance is unchanged. For example, the time to effectuate the entire lens movement is unchanged when determining the damping ratio. In this instance, there may be one time delay inserted into each measurement. In another embodiment, the time delay may be changed between each measurement, for example, when determining the ringing period. In this instance, there may be two time delays inserted into each measurement. In one embodiment, the time delays of a single measurement are equal.

In one embodiment, instructions included in the parameter determination module 240 may configure the processor 205 to receive the target distance from autofocus module 235 and determine the measurement parameters for each measurement, as described in reference to FIG. 2. For example, the processor 205 may be configured to divide the target distance into equal step sizes, whereby the first step size may be changed in subsequent iterative measurements. Further, the processor 205 may be configured to set the first time delay to a minimum unit of time, whereby the first time delay may be changed in subsequent measurements.

After the multiple measurement parameters of the instant measurement are determined, the process 600 continues to process block 630, where the lens is moved, at least in part, based on the measurement parameters. In some embodiments, the actuator (e.g., a VCM) may receive instructions from the lens control module 255 to move the lens to the next position based, at least in part, on the measurement parameters determined by the parameter determination module 240, as described in reference to FIG. 2. The functions of block 630 will be explained in further detail below with reference to FIG. 9.

After the lens is moved based on the measurement parameters, the process 600 continues to block 640, where the performance indicator for the instant measurement is measured and recorded. The performance indicator may be based on the quality of the image or the quality of the focus at the instant when the lens is finished moving. The image is captured as soon as the lens has completed the movements based on the measurement parameters, thus any lens vibrations imparted on the lens may affect the quality of the image and focus. The lens vibrations may be combined to partially or completely cancel each other, based at least in part, on the measurement parameters. For example, different step sizes may result in lens vibrations of different magnitudes being imparted onto the lens. Further, different time delays may affect how the phases and polarity of each lens vibration line up with other lens vibrations from previous or subsequent lens movements. Therefore, each measurement within the process 600 may have a different lens vibration curve (e.g., FIGS. 4A-5E) which may affect the quality of the focus of each image captured during each measurement after moving the lens for each measurement.

In one embodiment, the performance indicator is a contrast value of an image captured based by the imaging device after the lens has moved the target distance to the focus position.

Referring to FIG. 2, in some embodiments, instructions in the performance measurement module 245 may configure the processor 205 to capture an image and measure the performance indicator for that image. Instructions in the performance measurement module 245 may configure the processor 205 to receive measurement completion instructions from the lens control module and the parameter determination module 240 indicating the completion of the lens movement for a given measurement. Based, at least in part, on the completion of the lens movement, the processor 205 can be configured to capture the image and measure the performance indicator. In another embodiment, the processor 205 may be configured by the performance measurement module 245 to record the performance in working memory 215 and/or storage 220. The performance indicator may be associated with a specific measurement. In this way, the performance indicator may be associated with a particular first measurement parameter of a measurement, e.g., the first set size and/or the first time delay of the instant measurement.

Again referring to FIG. 6, after the performance indicator is measured and recorded, the process 600 continues to decision block 650, where a determination is made as to whether the performance indicator of the instant measurement is lower than the previous measurement. In one embodiment, the performance indicator of a current measurement is compared with the performance indicator of a previous measurement. If the current measurement has a higher performance indicator than the previous measurement, then decision block 650 determines the current measurement produced a better focus and process 600 continues to block 660. If the current measurement has a lower performance indicator than the previous measurement, then the decision block 650 determines the current measurement produced a lower quality focus and the process continues to block 680. In some embodiments, instructions included in performance measurement module 245 of FIG. 2 may instruct the process 205 to retrieve the performance indicator of the previous measurement and determine whether the current performance indicator is lower or higher that the retrieved pervious measurement. In another embodiment, the determination may be performed by the processor 205 configured by the characteristic determination module 250. In some embodiments, the processor 205 may be configured based on instructions from both the characteristic determination module 250 and the performance measurement module 245 operating together. In yet, other embodiments, the instructions may be included elsewhere in the imaging device, e.g., at least one software process executed by a logic device.

In some embodiments, where the performance indicator is lower than the previous measurement, the process 600 may be repeated for a subsequent scan sequence. In this case, process 600 would repeat the measurement method described herein to locate the largest performance indicator, but the first measurement parameter may be adjusted with a smaller magnitude than in a previous scan sequence. For example, the incremental change of step size ($a_0$) or time delay ($t_1$) may be smaller in magnitude and be configured to change the step size ($a_0$) or time delay ($t_1$) by a smaller amount as compared to the previous scan sequence. More step sizes may be possible if the incremental change is significantly smaller than the previous scan sequence. The result is that the multiple scan sequences may be performed with more precise measurement parameters than the previous scan sequences, thereby enabling a first scan sequence to perform rough measurements and subsequent scan sequences perform increasingly finer scan sequences. In this way, the system may quickly and efficiently zero in on the highest performance indicator.

If the determination is made at decision block 650, that the performance indicator of the current measurement is lower than the previous measurement, then the process 600 moves to block 680. At block 680 the process 600 determines the actuation characteristic. In some embodiments, the characteristics determination module 250 of FIG. 2 may include instructions to configure the processor 205 to determine the characteristics of the actuator, based on inputs received from the performance measurement module 245 and/or parameter determination module 240.

In one embodiment, the processor 205 can be configured to determine the ring period. The ring period may be based on the time delay $t_1$ of the measurement having the largest performance indicator. In one embodiment, the algorithm may determine the ring period (T) to be three times the time delay $t_1$ of the measurement having the largest performance indicator, where the number of steps is three. In other embodiments, the ring period may be equal to the identified first time delay $t_1$ of the measurement having the highest measured performance indicator multiplied by the number of the steps (n) (e.g., $T=t_1*n$).

In another embodiment, the processor 205 can be configured to determine the damping ratio. The damping ratio may be based on the first step size $a_0$ of the measurement having the largest performance indicator. In one embodiment, the algorithm may determine the ratio of the damping ratio to the angular velocity ($\gamma/\omega_0$) based on the step size $a_0$ of the measurement having the largest performance indicator divided by the target distance A. In another embodiment, $a_0/a_1=e^{\wedge}(\pi\gamma/\omega_0)$, where the characteristic of the lens vibration includes one of the dampening ratio ($\gamma$) where the angular velocity ($\omega_0$) is related to a predetermined ringing period of the actuator. Thus, in some embodiments, the ring period must be known, either through process 600 or stored in the memory of imaging device, prior to determining the damping ratio.

If the determination is not made at decision block 650, that the performance indicator of the current measurement is lower than the previous measurement, then the process 600 moves to block 660. At block 660 the process 600 returns the lens to the first position. For example, after each measurement, the lens may be positioned at the target position, e.g., the focus position. After the determination is made in the negative at block 650, the imaging device may move the lens back to the initial position being a target distance A from the target position (e.g., lines 420 and 520 described in reference to FIGS. 4A-5E). In some embodiments, the lens control module 255 of FIG. 2 may include instructions to configure the processor 205 to move the lens 212, via actuator 214, based on the inputs received from autofocus module 235 and performance measurement module 245 or characteristics determination module 250.

After the lens has been returned to the starting position, the process 600 continues to block 670, where the first measurement parameter is adjusted. In some embodiments, all measurement parameters are adjusted based on the adjustment to the first measurement parameter. At block 670, the first measurement parameter may be incrementally adjusted based on the results of decision block 650. In some embodiments, the adjustment in block 670 may occur before block 660. In other embodiments, the block 670 may occur at the same time as block 660. In yet other embodiments, the parameter determination module 240 of FIG. 2 may include instructions to configure processor 205 to adjust the measurement parameters based, at least in part, on inputs from the characteristic determination module 250 and/or the performance measurement module 245.

In some embodiments, the first measurement parameter of each measurement may be increased by some increment as detailed above in reference to FIGS. 4A-5E. For example, when determining the ring period, if the performance indicator of the previous measurement is lower than the current performance indicator, the time delay ($t_1$) of the measurement parameters may be increased by some increment of time. In some embodiments, the increment may be may be large for quickly and efficiently scanning the range of the actuator, for example the large incremental change may be determined such that the imaging device is configured to sweep the entire range of the ring period curve shown in FIG. 10. The incremental change should be set with enough resolution to determine the general shape of the curve and to roughly locate where a trough of the curve from which the ring period may be determined. In other embodiments, the increment may be fine for a more precise measurement. Considerations for setting a fine incremental change include, but are not limited to, the resolution of the measurement may be one limiting aspect of the increment change for the fine search. Other factors include, for example, actuator accuracy in positioning the lens per each movement input, actuator response speed variation, actuator friction variation, voltage variation, temperature variation, electromagnetic noise from surrounding components, movement of the device, etc. The imaging device may set the resolution limit based on previous knowledge from an evaluation of the imaging device or known data. In some embodiments, it may be possible that the imaging device can automatically detect when the measurement hits the resolution limit, for example, by continuing measurements for few iterative measurements after when step 650 determines the measurement having the highest contrast. The resolution limit may be hit if there are multiple peaks or troughs in the measurements, e.g., the two troughs shown in FIG. 10. Alternatively, when determining the damping ratio, if the performance indicator of the previous measurement is lower than the current performance indicator, the first step size ($a_0$) of the measurement parameter may be increased by some increment of distance. In some embodiments, the increment maybe large, such that the imaging device is configured to sweep a range defined by a maximum and minimum value of expected damping ratios. For example, a maximum expected value for the damping ratio over angular velocity may be 0.100, which is be unrealistically large for currently implemented imaging devices, while the minimum may be 0. From this, the incremental change to the step sizes may be set as to sweep the entire range from the minimum to the maximum. In other embodiments, the increment may be small for example, being set based on similar considerations as described in relation to the time delay.

In other embodiments, the first measurement parameter of each measurement may be decreased by some increment as detailed above, for example, when the imaging device utilized a large increment in a first scan sequence and now seeks a more precise measurement. For example, if the performance indicator of the previous measurement is lower than the current performance indicator, the system may reverse the direction of the incremental change, decrease the incremental change magnitude by which the first measurement parameter is adjusted, and repeat the process for multiple scan sequences.

After the measurement parameter is adjusted, the process 600 initiates a new measurement by returning to block 620. The new measurement receives updated measurement parameters based on the adjusted measurement parameters from block 670, and the process 600 repeats.

Figure 7:
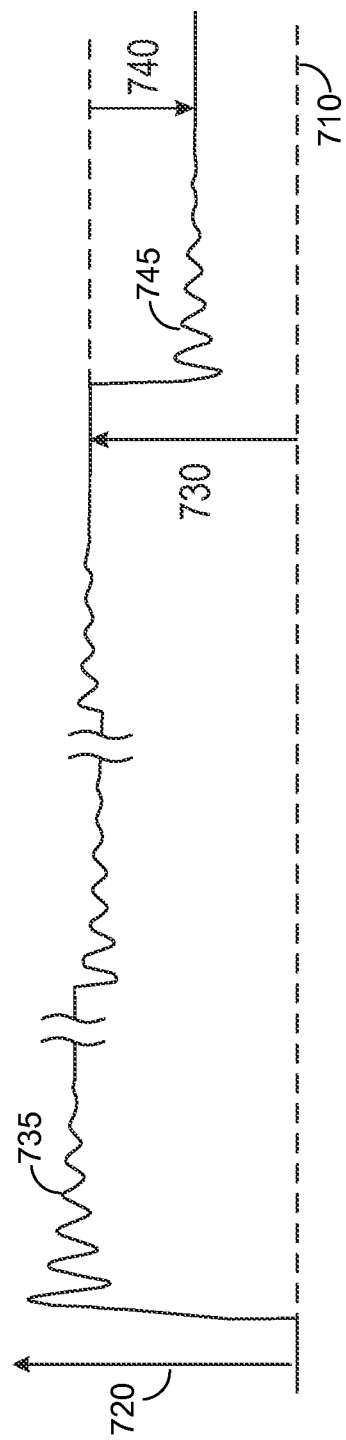
FIG. 7 illustrates the vibration of a lens in an imaging device while moving a lens the target distance in accordance with some embodiments.

FIG. 7 illustrates the vibration of a lens in an imaging device while determining the target distance in block 610 of process 600 in accordance with some embodiments. Line 720 represents an actual position of a lens of an imaging device, for example of the imaging device described in reference to FIGS. 1 and/or 3. For example, the line 710 may represent time and line 720 may represent a distance measurement. Thus FIG. 7 illustrates actual lens position over time. At a starting time, the lens may be positioned at any position along the range of the actuator of the imaging device. This position may be an operationally off position or a left over position from a previous lens movement. The curve 735 represents the actual lens position as a result of lens vibrations from moving the lens to a focus position by a distance 730, where the image captured by the imaging device is in focus. The distance that the actuator moves the lens to reach the focus position from the operationally off position is shown by line 730. After the focus position is located, the lens may be moved some distance 740 off the focus position, resulting in lens vibration curve 745. The distance the lens is moved away from the focus position may be the target distance 740, the distance being equal to a representative distance A. The features of FIG. 7 will be discussed in further detail with reference to the flowchart depicted in FIG. 8.

Figure 8:
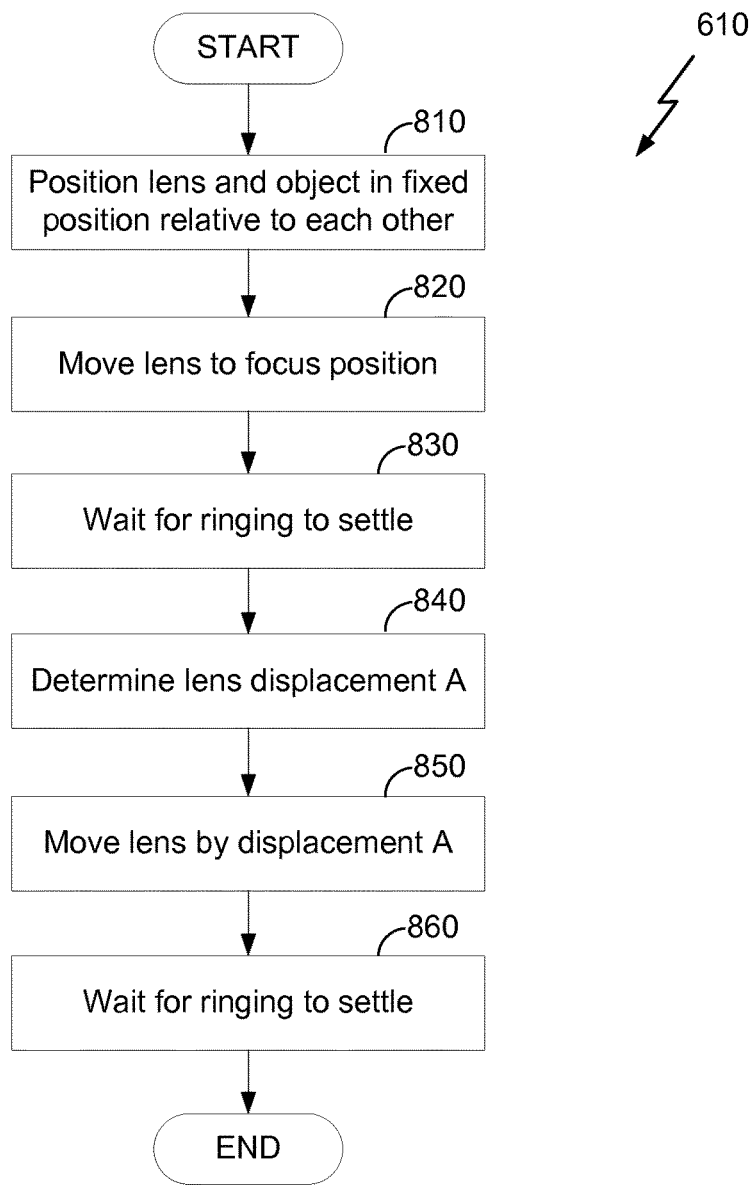
FIG. 8 is a flowchart of a method for moving a target distance in accordance with some embodiments.

FIG. 8 is a flowchart of an example of a process 610 of FIG. 6 for moving a lens a target distance in accordance with some embodiments. In some embodiments, the determination of the target distance and focus position, as described in reference to FIG. 7, may be performed by the processor 205 (FIG. 2) having been configured by instructions from autofocus module 235. In some embodiments, the functions of FIGS. 7 and 8 may be performed by an imaging device substantially similar to that described in reference to FIGS. 1 and/or 3, whereby the lens 212, 312 is moved by an actuator 214, 314, based on instructions received from memory 230 to configure processor 205. The process begins at a start block and then proceeds to block 810, where the position of the lens is fixed relative to an object or scene. The characteristic determination of process 600 may require a consistent and unchanging distance between the object or scene and the imaging device, such that the captured image is consistent between each successive measurement for accurate performance measurements. Thus, the distance between the object and the imaging device, more specifically the lens, may be substantially identical between measurements.

After the lens and object distance is fixed, the process continues to block 820, where the lens is moved to the focus position. In some embodiments, as described in reference to FIG. 7, the lens may be at a fixed starting position and be moved a distance 730 to the focus position. In some embodiments, actuator 214 (FIG. 2) may act to move lens 212 based on instructions from processor 205 configured by autofocus module 235. Upon completing the movement of the lens to focus position 730, lens vibration curve 735 may be imparted onto the lens causing a sinusoidal vibration of the actual location of the lens.

Returning to FIG. 8, after the lens is moved to the focus position, the process 610 moves to block 830, where the process waits a predetermined set time for the ringing to settle. The wait period should be set to a time period long enough for the ringing to settle prior to process 610 continuing. In some embodiments, the amount of time to wait at block 830 is based on the lens vibration illustrated as lens vibration curve 735 of FIG. 7. After the imaging device has waited the predetermined set period of time, the process 610 moves to block 840. At block 840, the target distance A is determined. One consideration for determining the target distance A includes, but is not limited to, providing a large target distance because a large target distance provides better measurement responses, e.g., more ringing. However, another consideration includes the distance between the object and the imaging device during the process 610. For example, where the object is reasonably close to the imaging device, the lens should be positioned far from the mounting space (e.g., mounting spacer 350 of FIG. 3), thereby affecting the amount of space available for the target distance.

After the target distance is determined, the process 610 moves to block 850, where the lens is moved the target distance. In some embodiments, actuator 214 of FIG. 2 may act to move lens 212 based on instructions from processor 205 configured by autofocus module 235. In other embodiments, as described in reference to FIG. 7, the lens may be moved a distance 740 equal to the target distance. Upon completing the movement of the lens target distance 740, lens vibration curve 745 may be imparted onto the lens causing a corresponding sinusoidal vibration of the actual location of the lens.

After the lens is moved to a target distance off the focus position, the process 610 moves to block 860, where the process waits a predetermined set time for the ringing to settle. The wait time period should be set to a time period long enough for the ringing to settle prior to process 610 continuing. In some embodiments, the amount of time to wait at block 860 is based on the lens vibration illustrated as lens vibration curve 745. After the imaging device has waited the predetermined set period of time, the process 610 concludes at the end step.

Figure 9:
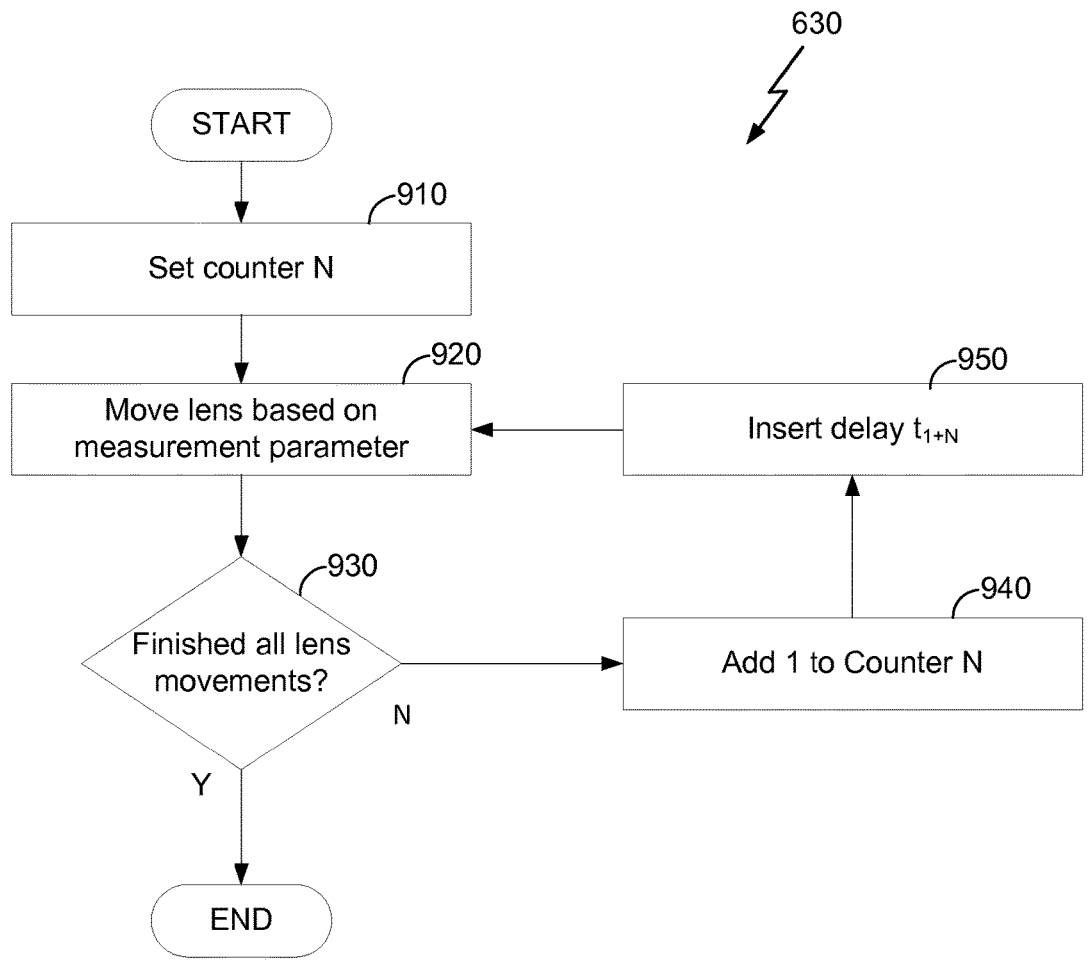
FIG. 9 is a flowchart of a method for moving a lens through a plurality of steps in accordance with one embodiment.

FIG. 9 is a flowchart of an example of process 630 of FIG. 6 for moving a lens based on measurement parameters accordance with one embodiment. Process 630 may be performed by imaging device 200, illustrated in FIG. 2. In some embodiments, the method may be implemented by processor 205 configured by instructions from the lens control module 255 based on inputs received from parameter determination module 240. In some embodiments, the processor 205 may cause the actuator 214 to move the lens 212 based on received measurement parameters, including but not limited to step sizes and time delays.

The process 630 begins at a start block and then proceeds to block 910, where a counter is set. In an illustrative embodiment, the counter is set to 0. In some embodiments, the counter may be implemented to keep track of the measurement parameters of the current measurement by incrementing the counter after each of the multiple measurement parameter including the size of and number of lens steps and time delays. In some embodiments, the lens control module 255 of FIG. 2 may include instructions to keep track of the number of lens steps and time delays by incrementing the counter. The number of measurement parameters, including lens steps and time delays, may be received from parameters determination module 245 as a result of block 620 of FIG. 6, where the measurement parameters are determined.

The process 630 then proceeds to block 930, where the lens is moved to the next step based on the multiple measurement parameters. In some embodiments, the actuator, e.g., a VCM, may receive instructions from the autofocus module 235 (FIG. 2) and/or the lens control module 255 to move the lens to a next lens position. The next lens positon may be at least one of the lens steps of the measurement parameters determined in block 620. After the lens is moved into the position, process 630 continues to decision block 930 to determine whether the process has moved the lens through all N measurement parameters (e.g., the imaging device has finished all lens movements). In this respect, process 630 may utilize the counter of block 920 by incrementing the counter to keep track of each measurement parameter, include the lens steps of the measurement parameter. If the counter is equal to N minus one, then decision block 930 determines the lens has moved through all N steps and the lens has reached the target position, e.g., focus position. In this situation, the process 630 may conclude at an end step. In some embodiments, after process 630 has completed, the process may continue to block 640 of FIG. 6, as described above, where the performance indicator for the current measurement may be measured and recorded.

Alternatively, if the counter is less than N minus one, then decision block 930 determines that all lens movements have not been completed and the process 630 continues to block 940. At block 940 the counter is incremented by a predetermined amount. In some embodiments, instructions included in lens control module 255 (FIG. 2) may determine that the current lens position is not equal to the total lens steps. In yet, another embodiment, the instructions may be included elsewhere in the imaging device, e.g., at least one software process executed by a logic device.

In some embodiments, the increase may be an integer, for example, 1, representing at least one of the measurement parameters. In this way the method may increment the counter to keep track of the measurement parameters, including the lens movements and corresponding time delays. Once the counter has been incremented, the process 630 continues to block 950, where a time delay may be inserted prior to the next lens movement. The next lens movement may be at least one of the N lens steps of the measurement parameters. In some embodiments, the time delay may be determined by instructions included in parameter determination module 245 (FIG. 2) as a component or aspect of the measurement parameters, as described above. Parameter determination module 245 may include instructions to determine the time delay and step size and operate in conjunction with lens control module 255 to insert the delay between each lens movement.

After the time delay is inserted, the process may proceed to block 920 and repeats the process for moving the lens through each of the measurement parameters until the counter value equals N (the number of determined measurement parameters or lens steps) minus one. Once all N lens steps are completed the process 630 may proceed to end block. In some embodiments, the process 630 may continue to block 640 where the performance indicator is measured and recorded.

FIG. 10 is a graphical representation of an example of why a three lens step measurement may be optimal for measuring the ring period. The graph depicted in FIG. 10 illustrates the completion time divided by the ring period plotted against the lens vibration (ringing) experienced by the lens while moving the lens through the target distance using three steps of equal sizes. In the embodiment illustrated in FIG. 10, the curve 1010 represents a max lens vibration plotted against the ratio of the completion time (e.g., amount of time to move the lens through the three steps) over the ring period of the actuator. In the embodiment used to derive the specific example shown in FIG. 10, the damping ratio is known to be $\gamma/\omega_0=0.035$, where $\gamma$ is equal to 0.011 rad/ms, and the ring period is 20 ms. However, the results shown in FIG. 10 are independent of the value of $\gamma/\omega_0$ and the ring period. The nature of FIG. 10, that the troughs appear at completion time over ring period equal to one and 2, is true for any value of $\gamma/\omega_0$ and ring period. The target distance A is equal to 100 μm, and each step size ($a_0$, $a_1$, and $a_2$) are equal to 33.33 μm. In this embodiment, as shown in FIG. 10, the minimum lens vibration is equal to 3.58558 μs when the ratio of the completion time over ring period is 1. Thus, FIG. 10 illustrates that by using three lens steps and a default $t_1=T/3$ and $t_2=T/3*2$, there is a minimum lens vibration when the completion time is equal to the ring period (T). This can be seen due to the minimum of the troughs of curve 1010 being located at a completion time to ring period being equal to 1 and 2. Therefore, one consideration in deciding the rough incremental change to apply to time delay $t_1$ includes, but is not limited to, avoiding trapping a given scan sequence in the second trough. Where the incremental change to the time delay $t_1$ is too large, the scan sequence may be become stuck or trapped in the second trough, providing inaccurate results for the ring period determination.

Figure 11:
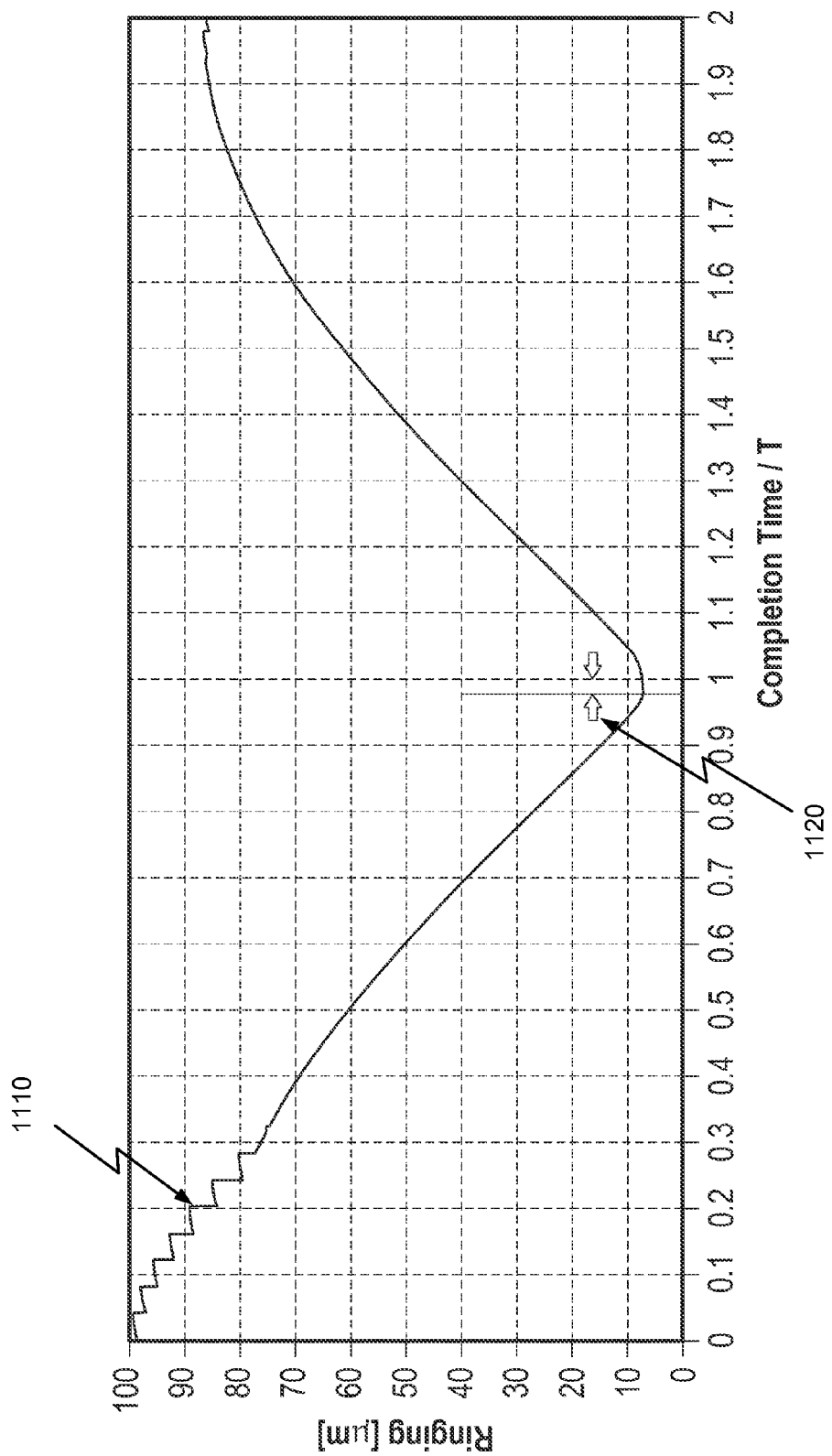
FIG. 11 is a graphical representation of using a two lens step measurement for measuring the ring period in accordance with some embodiments.

FIG. 11 is a graphical representation of an example of why a two lens step measurement may not optimal for measuring the ring period. The graph depicted in FIG. 11 illustrates the completion time divided by the ring period plotted against the lens vibration experienced by the lens while moving the lens through the target distance using two steps of equal size. In the embodiment illustrated in FIG. 11, the curve 1110 represents a max lens vibration plotted against the ratio of the completion time (e.g., amount of time to move the lens through the three steps) over the ring period of the actuator. In this embodiment, the damping ratio is known to be $\gamma/\omega_0=0.050$, where $\gamma$ is equal to 0.01571 rad/ms, and the ring period is 20 ms. The target distance A is equal to 100 μm, and each step size ($a_0$ and $a_1$) are equal to 50 μm. In this embodiment, as shown in FIG. 11, the minimum lens vibration is equal to 6.872 ms when the ratio of the completion time over ring period is 0.9790. Thus, FIG. 11 illustrates that by using two lens steps and a default ratio of $a_0/A=0.5$, there is a minimum lens vibration when the completion time is shorter than ring period (T). This can be seen at difference 1120, where the minimum of the trough of curve 1110 is occurs when the ratio of the completion time to ring period is not equal to 1.

Figure 12:
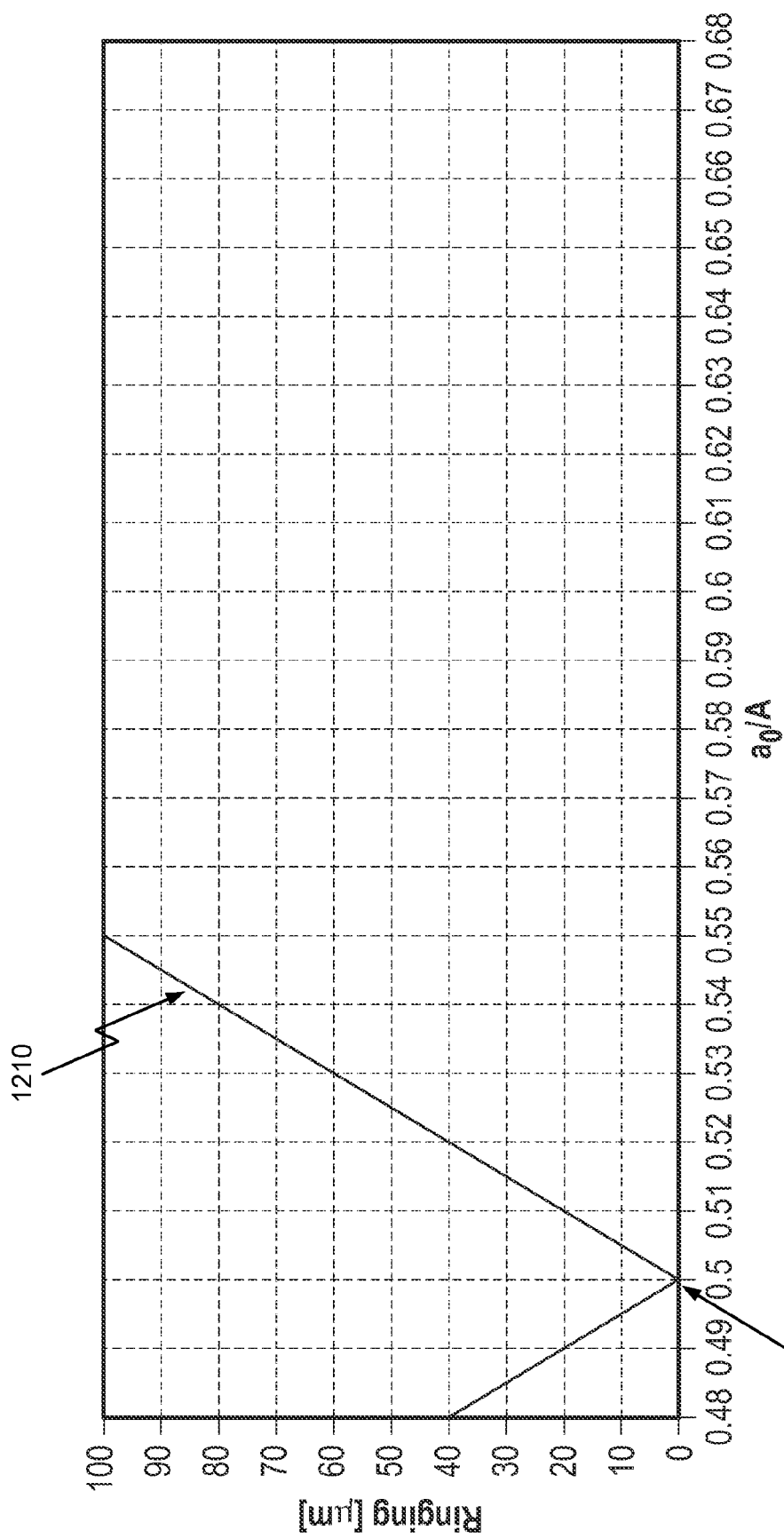
FIGS. 12-15 are examples of graphical representations of using a two lens steps measurement for measuring the damping ratio for a variety of actuators in accordance with some embodiments.

FIGS. 12-15 are graphical representations of why a two lens steps measurement is optimal for measuring the damping ratio for a variety of actuators. The graph depicted in FIG. 12 illustrates the $a_0/A$ plotted against the lens vibration experienced by the lens while moving the lens through the target distance using two steps of equal size, where $\gamma/\omega_0=0.000$ (not a realistic case). In the embodiment illustrated in FIG. 12, the curve 1210 represents a max lens vibration plotted against the ratio of the first step size ($a_0$) over the target distance (A). In this embodiment, the damping ratio is an ideal case where $\gamma/\omega_0=0.0$, where $\gamma$ is equal to 0.0 rad/ms and $\omega_0=0.3142$ rad/ms, and the ring period is 20 ms. The target distance A is equal to 100 μm, and each step size ($a_0$ and $a_1$) are equal to 50 μm. In this embodiment, as shown in FIG. 12, the minimum lens vibration is equal to 0.0 ms when $a_0$ is 0.5, shown as item 1220. At this point the measured damping ratio $(\gamma/\omega_0)_0$ is 0.0. Thus, $a_0/A=0.5$, and $a1/A=(A-a_0)/A=1-a_0/A=0.5$, where the following conditions apply:

$$\frac{a_0}{a_1} = e^{\frac{\pi\gamma}{\omega_0}} \rightarrow \frac{\gamma}{\omega_0} = \frac{1}{\pi}\log_e\frac{a_0}{a_1} = 0.000$$

Figure 13:
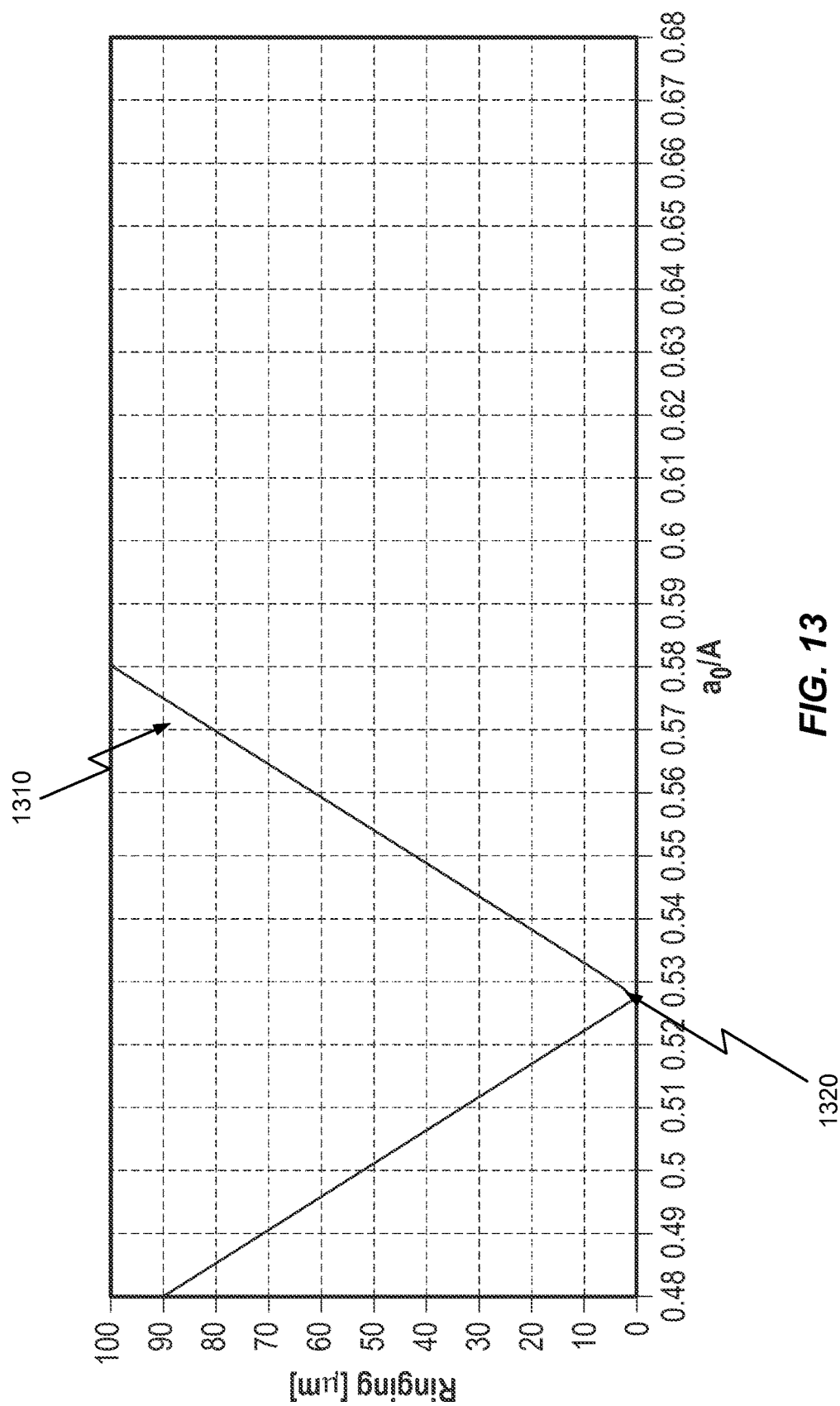

The graph depicted in FIG. 13 illustrates the $a_0/A$ plotted against the lens vibration experienced by the lens while moving the lens through the target distance using two steps of equal size, where $\gamma/\omega_0=0.035$. In the embodiment illustrated in FIG. 13, the curve 1310 represents a max lens vibration plotted against the ratio of the first step size ($a_0$) over the target distance (A). In this embodiment, the damping ratio is known to be $\gamma/\omega_0=0.035$, where $\gamma$ is equal to 0.011 rad/ms and $\omega_0=0.3142$ rag/ms, and the ring period is 20 ms. The target distance A is equal to 100 μm. In this embodiment, as shown in FIG. 13, the minimum lens vibration is equal to 0.58702 μm when $a_0/A$ is 0.5272, shown as item 1320. At this point the measured damping ratio $(\gamma/\omega_0)$ is 0.0347. Thus, $a_0/A=0.5272$ and $a1/A=(A-a_0)/A=1-a_0/A=0.4728$, where the following conditions apply:

$$\frac{a_0}{a_1} = e^{\frac{\pi\gamma}{\omega_0}} \rightarrow \frac{\gamma}{\omega_0} = \frac{1}{\pi}\log_e\frac{a_0}{a_1} = 0.0347(\approx 0.035)$$

Figure 14:
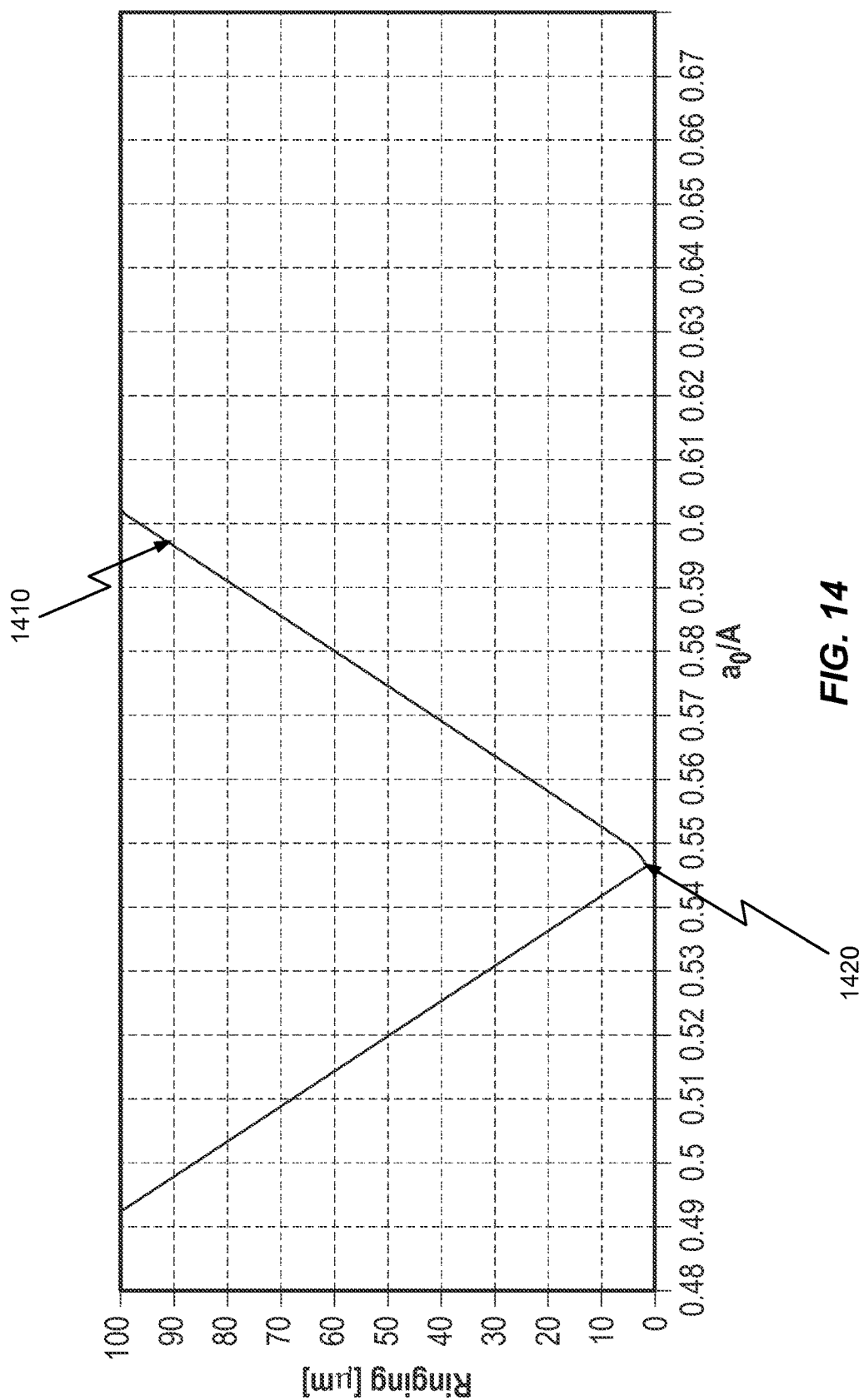

The graph depicted in FIG. 14 illustrates the $a_0/A$ plotted against the lens vibration experienced by the lens while moving the lens through the target distance using two steps of equal size, where $\gamma/\omega_0=0.060$. In the embodiment illustrated in FIG. 14, the curve 1410 represents a max lens vibration plotted against the ratio of the first step size ($a_0$) over the target distance (A). In this embodiment, the damping ratio is known to be $\gamma/\omega_0=0.060$, where $\gamma$ is equal to 0.01885 rad/ms and $\omega_0=0.3142$ rag/ms, and the ring period is 20 ms. The target distance A is equal to 100 μm. In this embodiment, as shown in FIG. 14, the minimum lens vibration is equal to 1.58639 μm when $a_0/A$ is 0.5462, shown as item 1420. At this point the measured damping ratio $(\gamma/\omega 0)$ is 0.0590. Thus, $a_0/A=0.5462$ and $a1/A=(A-a_0)/A=1-a_0/A=0.4538$, where the following conditions apply:

$$\frac{a_0}{a_1} = e^{\frac{\pi\gamma}{\omega_0}} \rightarrow \frac{\gamma}{\omega_0} = \frac{1}{\pi}\log_e\frac{a_0}{a_1} = 0.0590(\approx 0.060)$$

Figure 15:
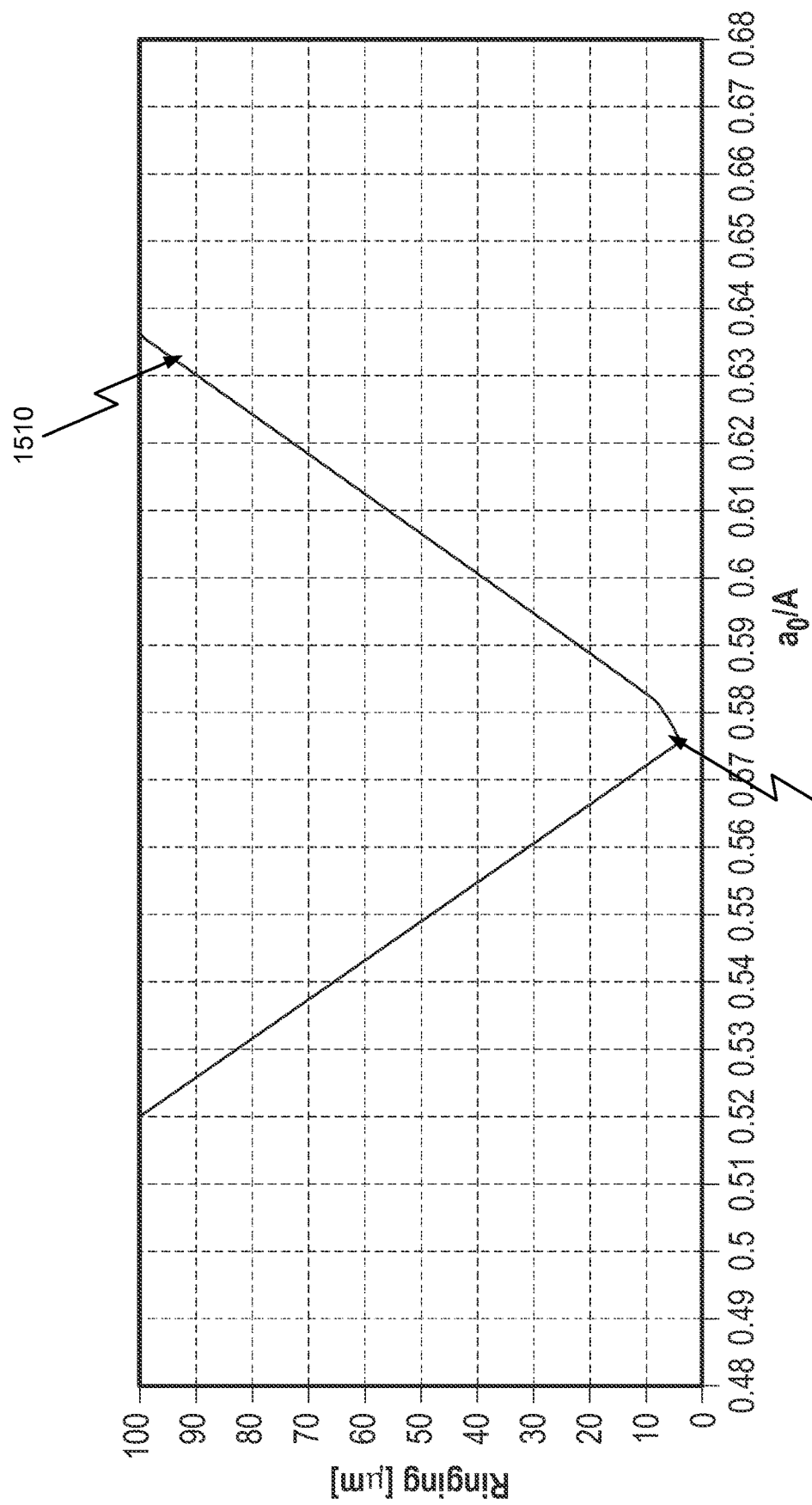

The graph depicted in FIG. 15 illustrates the $a_0/A$ plotted against the lens vibration experienced by the lens while moving the lens through the target distance using two steps of equal size, where $\gamma/\omega_0=0100$. In the embodiment illustrated in FIG. 15, the curve 1510 represents a max lens vibration plotted against the ratio of the first step size ($a_0$) over the target distance (A). In this embodiment, the damping ratio is known to be $\gamma/\omega_0=0.1$, where $\gamma$ is equal to 0.03142 rad/ms and $\omega_0=0.3142$ rag/ms, and the ring period is 20 ms. The target distance A is equal to 100 μm. In this embodiment, as shown in FIG. 15, the minimum lens vibration is equal to 3.85104 μm when $a_0/A$ is 0.5757, shown as item 1520. At this point the measured damping ratio $(\gamma/\omega_0)$ is 0.0971. Thus, $a_0/A=0.5757$ and $a1/A=(A-a_0)/A=1-a_0/A=0.4243$, where the following conditions apply:

$$\frac{a_0}{a_1} = e^{\frac{\pi \gamma}{\omega_0}} \rightarrow \frac{\gamma}{\omega_0} = \frac{1}{\pi} \log_e \frac{a_0}{a_1} = 0.0971 (\approx 0.100)$$

Figure 16:
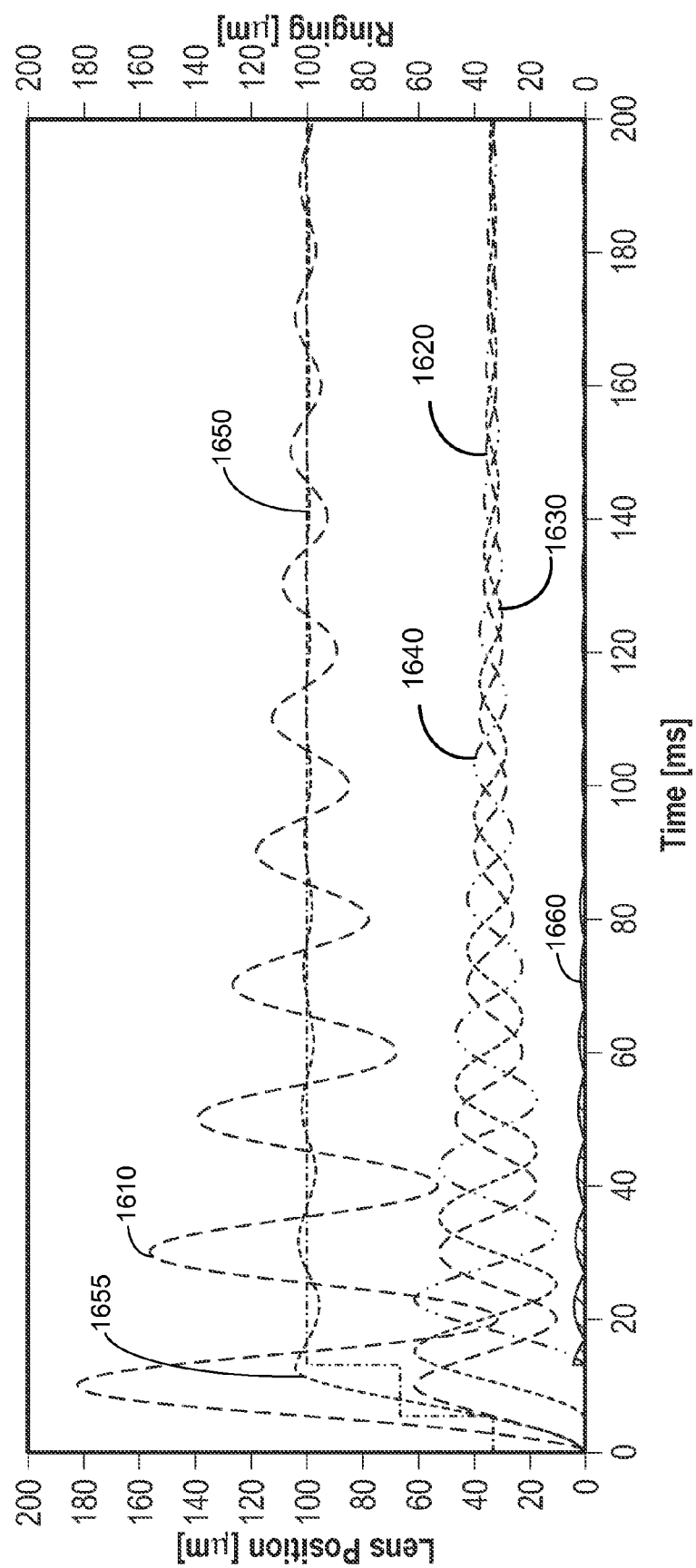
FIG. 16 is a graphical representation of using a three lens step measurement measuring the damping ratio in accordance with some embodiments.

FIG. 16 is a graphical representation of an example of why a three lens step measurement may not be optimal for measuring the damping ratio. FIG. 16 illustrates the use of a three step lens movement where lens vibrations imparted on the lens after moving, the resulting lens vibration is not large enough to create a measurable difference in order to calculate the damping ration ($\gamma/\omega_0$). For example, the embodiment depicted in FIG. 16, includes lens position curves (actual and target positions) plotted against time, along with the resulting lens vibration plotted against time. Specifically, curve 1610 illustrates an actual lens having vibration imparted on a lens due to moving the lens from a zero position to the target distance, e.g., 100 µm as depicted, in a single lens movement. Curve 1650 illustrates target positions as the lens is moved from a zero position to a target position through three lens steps ($a_0$, $a_1$, and $a_2$), each step being delayed by a time delay shown in FIG. 16. Curves 1620, 1630, and 1640 illustrate the lens vibrations imparted onto a lens due to each lens movements $a_0$, $a_1$, and $a_2$, respectively, and curve 1655 illustrates the lens vibrations imparted as a result of all the lens movements $a_0$, $a_1$, and $a_2$. Curve 1655 illustrates the actual lens movement experienced by the lens due to moving the lens the target distance. Curve 1660 illustrate the resulting ringing or lens vibration magnitude after the lens has moved the target distance via the three steps ($a_0$, $a_1$, and $a_2$) and the two time delays ($t_1$ and $t_2$). Further specifications of this embodiment include that the damping ratio is known to be $\gamma/\omega_0=0.06$, where $\gamma$ is equal to 0.01885 rad/ms and $\omega_0=0.3142$ rag/ms, and the ring period is 20 ms. The target distance A is equal to 100 µm, and each step size ($a_0$, $a_1$, and $a_2$) are equal to 33.33 µm and $t_1$ is 5.207.

In the embodiment depicted in FIG. 16, the time delays have a lag imposed to create exaggerated ringing. For example, a lag of 1.46 ms is applied to $t_1$ and a lag of 0.404 ms is applied to $t_2$. The lag is applied to create a larger lens vibration by which the damping ratio may be measured. Under normal operating conditions, the lags are the optimal value when $\gamma/\omega_0=0.100$, but 0.060 is used in the embodiment shown in FIG. 16 to indicate that ringing is not large enough to enable an accurate measurement of the damping ratio, even with an exaggerated $\gamma/\omega_0$. In this embodiment, even when creating exaggerated ringing, the measured maximum vibration (curve 1660) is 4.25807 µm. The lens vibration is not large enough for the imaging device to find determine the optimal damping ratio ($\gamma/\omega_0$). Thus, the three lens step measurement is not an optimal method for determining the damping ratio.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for determining an actuation characteristic of an imaging device comprising:
   determining a target distance to move a lens by an actuator to focus a scene on an image sensor, wherein moving the lens by the actuator causes an associated lens vibration having a ring period;
   determining a scan sequence having a plurality of successive measurements, each measurement having at least a first measurement parameter and subsequent measurement parameter, each measurement parameter including at least one step and at least one time delay;

moving the lens the target distance for each successive measurement based on the measurement parameters of each successive measurement;

measuring a performance indicator of each successive measurement; and determining a damping ratio of the lens actuation based on the ring period and the step of the first measurement parameter having the highest measured performance indicator.

2. The method of claim 1, wherein the lens vibration is a sinusoidal ringing imparted to the lens due to the actuator, wherein the sinusoidal ringing is related to vibrations and friction resulting from the movement.

3. The method of claim 2, wherein the sinusoidal ringing is characterized by:

$$u_N(t) = A\{1 - e^{-\gamma t}\cos(Kt)\}, K = \sqrt{\omega_o^2 - \gamma^2}$$

wherein N is one of the first and subsequent steps, A is the target distance, $\omega_0$ is the ringing angular velocity, $\gamma$ is the damping ratio, and K is a known constant based on the ringing angular velocity and the damping ratio; and wherein the ringing angular velocity and damping ratio are related to the vibrations and friction resulting from the movement.

4. The method of claim 1, wherein the first step of the first measurement parameter and all subsequent steps of all subsequent measurement parameters combine to equal the target lens distance.

5. The method of claim 4, wherein the first step of the first measurement parameter is the target distance divided by the number of measurement parameters for each successive measurement.

6. The method of claim 5, wherein each successive measurement includes a first measurement parameter, having at least a first step, and a second measurement parameter, having at least a second step.

7. The method of claim 6, wherein the first measurement parameter includes a time delay inserted after the first step and before the second measurement parameter, wherein the time delay is based on the ring period of the lens vibration.

8. The method of claim 7, wherein the moving the lens the target distance for each successive measurement further comprises:

moving the lens by the first step of the first measurement parameter in a direction toward the focus position, the first step causing a first lens vibration;

retrieving the time delay; and repeating the moving for the second step until the lens is moved the target distance, the second steps being delayed by the time delay, the second step causing a second lens vibration, wherein the moving the lens through all steps is completed within a period of time substantially equal to the ring period of the lens vibration.

9. The method of claim 7, wherein the measuring the performance indicator of each successive measurement further comprises:

measuring a performance indicator, the lens being positioned at the target distance, wherein the performance indicator corresponds to a contrast value of the scene on the image sensor;

adjusting the first measurement parameter by sweeping the first step for each successive measurement through a plurality of first steps, wherein the target distance is unchanged; and repeating said moving the lens and measuring the performance indicator based on each of the plurality of first steps of each successive measurement, wherein each successive measurement is associated with a performance indicator.

10. The method of claim 5, wherein the damping ratio is characterized by $a_0/a_1 = e^{\wedge}(\pi\gamma/\omega_0)$, wherein $a_0$ is the first step and $a_1$ is the second step of the successive measurement having the highest measured performance ratio, $\gamma$ is the damping ratio, and $\omega_0$ is the angular velocity being related to the ringing period of the lens vibration.

11. The method of claim 1, wherein the first measurement parameter of each measurement is incrementally adjusted based on the first measurement parameter of the preceding measurement.

12. The method of claim 1, wherein the moving the lens the target distance for each successive measurement further comprises:

moving the lens a first step based on the first measurement parameter of a first measurement in a direction toward the focus position;

inserting the time delay of the first measurement parameter after moving the lens by the first step; and repeating said moving based on each subsequent measurement parameter, having a subsequent step and time delay, until the lens is moved the target distance, returning the lens to the focus position, inserting each subsequent time delay between each subsequent step, wherein the moving the lens through all steps is completed within a time substantially equal to the sum of the first and subsequent time delays.

13. The method of claim 1, further comprising:

adjusting the first measurement parameter of each successive measurement incrementally based on the first measurement parameter of the preceding measurement;

identifying a measurement resulting in a decrease in the measured performance indicator of the scene as compared to the performance indicator of a preceding measurement; and adjusting the first measurement parameter of a plurality of measurements of a subsequent scan sequence by an increment that is smaller than adjustment of the first measurement parameter of the scan sequence.

14. The method of claim 1, wherein the performance indicator correspond to a contrast value of the scene captured by the imaging device as a result of moving the lens the target distance for each successive measurement.

15. The method of claim 1, wherein the ring period of the lens actuation is determined prior to determining the damping ratio.

16. An apparatus for determining lens actuation characteristics of an imaging device, comprising:

a lens;

a lens actuator;

a memory circuit storing instructions for determining lens actuation characteristics;

at least one processor, operably coupled to the lens actuator and the memory circuit, and configured by the instructions to at least:

determine a current lens position and a target lens position, wherein the distance between the current lens position and target lens position is a target distance;

determine a scan sequence having a plurality of successive measurements, each measurement having at least a first measurement parameter and subsequent measurement parameter, each measurement parameter including at least one step and at least one time delay;

move the lens the target distance for each successive measurement based on the measurement parameters of each successive measurement;

measure a performance indicator of each successive measurement; and determine a ring period of the lens actuation based on the at least one time delay of the first measurement parameter of the measurement having the highest performance indicator.

17. The apparatus of claim 16, wherein the at least one processor is further configured to incrementally adjust the first measurement parameter based on the first measurement parameter of a preceding measurement.

18. The apparatus of claim 16, wherein the at least one processor is further configured to:

identify the first measurement parameter of successive measurement having the highest measured performance indicator of the scene; and determine the ring period based on the identified first measurement parameter.

19. An apparatus for determining lens actuation characteristics of an imaging device, comprising:

a lens;

a lens actuator;

a memory circuit storing instructions for determining lens actuation characteristics;

at least one processor, operably coupled to the lens actuator and the memory circuit, and configured by the instructions to at least:

determine a current lens position and a target lens position, wherein the distance between the current lens position and target lens position is a target distance, wherein moving the lens by the actuator causes an associated lens vibration having a ring period;

determine a scan sequence having a plurality of successive measurements, each measurement having at least a first measurement parameter and subsequent measurement parameter, each measurement parameter including at least one step and at least one time delay;

move the lens the target distance for each successive measurement based on the measurement parameters of each successive measurement;

measure a performance indicator of each successive measurement; and determine a damping ratio of the lens actuation based on the ring period and the step of the first measurement parameter of the measurement having the highest performance indicator.

20. The apparatus of claim 19, wherein the at least one processor is further configured to incrementally adjust the first measurement parameter based on the first measurement parameter of a preceding measurement.

21. The apparatus of claim 19, wherein the at least one processor is further configured to:

identify the first measurement parameter of successive measurement having the highest measured performance indicator of the scene; and determine the damping ratio based on the identified first measurement parameter.

22. A method for determining an actuation characteristic of an imaging device comprising:

determining a target distance to move a lens by an actuator to focus a scene on an image sensor, wherein moving the lens by the actuator causes an associated lens vibration having a ring period;

determining a scan sequence having a plurality of successive measurements, each measurement having at least a first measurement parameter and subsequent measurement parameter, each measurement parameter including at least one step and at least one time delay;

moving the lens the target distance for each successive measurement based on the measurement parameters of each successive measurement;

measuring a performance indicator of each successive measurement; and determining the ring period of the lens actuation based on the at least one time delay of the first measurement parameter of the measurement having the highest performance indicator.

23. The method of claim 22, wherein the first step of the first measurement parameter and all subsequent steps of all subsequent measurement parameters combine to equal the target distance.

24. The method of claim 23, wherein each measurement parameter includes a first time delay and a second time delay, wherein the first time delay is set to a minimum unit of time and the second time delay is substantially equal to the first time delay.

25. The method of claim 24, wherein each measurement parameter includes at least a first, second and third step.

26. The method of claim 25, wherein the moving the lens the target distance for each successive measurement further comprises:

moving the lens the first step of the first measurement parameter in a direction toward the focus position, the first step of the first measurement parameter causing a first lens vibration;

inserting the time delay of the first measurement parameter after moving the lens by the first step; and repeating said moving based on each subsequent measurement parameter, having a subsequent step and time delay, until the lens is moved the target distance, returning the lens to the focus position, inserting each subsequent time delay between each subsequent step, each subsequent step causing a subsequent lens vibration, wherein the moving the lens through all steps is completed within a time substantially equal to the sum of the first and subsequent time delays.

27. The method of claim 24, wherein the measuring of the plurality of performance indicators further comprises:

measuring a contrast of the scene on the image sensor, the lens being positioned at the focus position;

adjusting the first measurement parameter by sweeping the first time delay for each successive measurement though a plurality of first time delays, wherein each of the plurality of first time delays is changed by adding an increment of time; and repeating the moving the lens and measuring the performance indicator for each of the plurality of first time delays of each successive measurement, wherein each measurement is associated with a measured performance indicator.

28. The method of claim 27, wherein the ringing period is approximately equal to the identified first time delay of the successive measurement having the highest measured performance indicator multiplied by the number of measurement parameters.

29. The method of claim 22, wherein the first measurement parameter of each measurement is incrementally adjusted based on the first measurement parameter of the preceding measurement.

* * * * *